United States Patent
Takahashi

(10) Patent No.: US 7,817,372 B2
(45) Date of Patent: Oct. 19, 2010

(54) HEAD FLYING HEIGHT CONTROL METHOD, WRITE CURRENT VALUE DETERMINING METHOD, AND STORAGE DEVICE

(75) Inventor: Tsuyoshi Takahashi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/365,612

(22) Filed: Feb. 4, 2009

(65) Prior Publication Data

US 2009/0310246 A1 Dec. 17, 2009

(30) Foreign Application Priority Data

Jun. 12, 2008 (JP) .............................. 2008-154733

(51) Int. Cl.
G11B 21/02 (2006.01)
G11B 27/36 (2006.01)

(52) U.S. Cl. .......................................... 360/75; 360/31

(58) Field of Classification Search ....................... None
See application file for complete search history.

(56) References Cited

U.S. PATENT DOCUMENTS

| 7,330,324 | B2 | 2/2008 | Morinaga et al. |
| 2005/0094300 | A1 | 5/2005 | Yano et al. |
| 2007/0230002 | A1* | 10/2007 | Kassab ........................ 360/31 |
| 2007/0230034 | A1* | 10/2007 | Kondo ..................... 360/78.04 |

FOREIGN PATENT DOCUMENTS

| JP | A 10-241333 | 9/1998 |
| JP | A 11-185210 | 7/1999 |
| JP | 2001-143209 | 5/2001 |
| JP | A 2003-168274 | 6/2003 |
| JP | A 2005-71546 | 3/2005 |
| JP | A 2005-135543 | 5/2005 |
| JP | A 2006-4474 | 1/2006 |
| JP | A 2006-18987 | 1/2006 |
| JP | A 2007-273024 | 10/2007 |
| JP | A 2007-310978 | 11/2007 |
| KP | A 2003-272335 | 9/2003 |
| KR | 10-2007-0111944 | 11/2007 |

OTHER PUBLICATIONS

Korean Office Action issued Jun. 23, 2010, in corresponding Korean Application No. 10-2009-0014762.

* cited by examiner

*Primary Examiner*—Andrew L Sniezek
(74) *Attorney, Agent, or Firm*—Greer, Burns & Crain, Ltd.

(57) ABSTRACT

A head flying height control method includes the steps of: detecting contact of a head having a heater with a corresponding storage medium, and associating the amount of heat generated by the heater when the contact is detected with a situation where the flying height of the head is zero; measuring at least one type of characteristics that are the saturation characteristics of the read margin of data written on the storage medium with the head, and the saturation characteristics of the electromagnetic conversion characteristics of the head, the measuring step being carried out every time the flying height of the head is varied, with a reference being the situation where the flying height of the head is zero, the current used for writing the data being a parameter in the saturation characteristics; and adjusting the flying height of the head, based on the measurement result of the measuring step.

9 Claims, 23 Drawing Sheets

SLICE LEVEL

DATA LOSS DUE TO THERMAL ASPERITY

READ DATA SECTOR
(OR SUPPORT SECTOR)

TA DETECTION SIGNAL

READ SIGNAL WAVEFORM FORMED DUE TO MINUTE PROTRUSIONS

READ OUTPUT
READ WAVEFORM

READ GATE SIGNAL

SERVO FRAME   DATA SECTOR

DATA SECTOR

DATA LOSS DUE TO MINUTE PROTRUSIONS

NORMAL HEAD OUTPUT AMPLITUDE WAVEFORM

WAVEFORM OBSERVED WHEN DISTURBANCES ARE CAUSED IN AMPLITUDE WAVEFORM DUE TO DECREASE IN HEAD FLYING HEIGHT AND MINUTE PROTRUSIONS

FIG. 15C   DISTURBANCES IN WAVEFORM DUE TO MINUTE PROTRUSIONS

DATA LOSS DUE TO MINUTE PROTRUSIONS

FIG. 20A

| | ZONE 0 | ZONE 1 | ZONE 2 | ZONE 3 | ZONE 4 | . | . | . | . | . | . | zonem |
|---|---|---|---|---|---|---|---|---|---|---|---|---|
| HEAD No. 0 | α00 | α01 | α02 | α03 | α04 | . | . | . | . | . | . | α0m |
| HEAD No. 1 | α10 | α11 | α12 | α13 | α14 | . | . | . | . | . | . | α1m |
| HEAD No. 2 | α20 | α21 | α22 | α23 | α24 | . | . | . | . | . | . | α2m |
| . | | | | | | . | . | . | . | . | . | . |
| . | | | | | | . | . | . | . | . | . | . |
| . | | | | | | . | . | . | . | . | . | . |
| HEAD No. n | αn0 | αn1 | αn2 | αn3 | αn4 | . | . | . | . | . | . | αnm |

FIG. 20B

| | ZONE 0 | ZONE 1 | ZONE 2 | ZONE 3 | ZONE 4 | . | . | . | . | . | . | zonem |
|---|---|---|---|---|---|---|---|---|---|---|---|---|
| HEAD No. 0 | α00' | α01' | α02' | α03' | α04' | . | . | . | . | . | . | α0m' |
| HEAD No. 1 | α10' | α11' | α12' | α13' | α14' | . | . | . | . | . | . | α1m' |
| HEAD No. 2 | α20' | α21' | α22' | α23' | α24' | . | . | . | . | . | . | α2m' |
| . | | | | | | . | . | . | . | . | . | . |
| . | | | | | | . | . | . | . | . | . | . |
| . | | | | | | . | . | . | . | . | . | . |
| HEAD No. n | αn0' | αn1' | αn2' | αn3' | αn4' | . | . | . | . | . | . | αnm' |

HEAD FLYING HEIGHT CONTROL METHOD, WRITE CURRENT VALUE DETERMINING METHOD, AND STORAGE DEVICE

CROSS-REFERENCE TO RELATED APPLICATION

This application is based upon and claims the benefit of priority of the prior Japanese Patent Application No. 2008-154733, filed on Jun. 12, 2008, the entire contents of which are incorporated herein by reference.

FIELD

The present embodiments generally relate to head flying height control methods, write current value determining methods, and storage devices.

BACKGROUND

Storage devices such as magnetic disk devices (or hard disk drives (HDD)) are used in various apparatuses including portable electronic apparatuses such as desktop personal computers, notebook personal computers, servers, AV (audio and visual) equipments, and PDA (personal digital assistants), and electronic apparatuses for automobiles such as car navigation systems.

As the memory capacity of each HDD has increased, the recording density (the area density) of each magnetic disk is becoming higher, and the flying height of each head with respect to a magnetic disk is becoming very small. Also, the flying height of each head provided in each HDD with respect to a magnetic disk is controlled with negative pressure generated between the head and the magnetic disk. The value of the negative pressure is almost constant wherever the head is located, but slightly varies depending on the shape of the head floating face and the surface roughness of the magnetic disk. The variation of the head flying height caused by the variation of the negative pressure leads to a head crash due to head disk interference. Therefore, improvements have been made on the head floating face and the magnetic disk surface. The variation of the head flying height also affects read and write performances and head crashes, and its influence is becoming larger as the recording density is becoming higher.

On the other hand, in conventional cases, the floating characteristics of each head are designed so as to cancel variations caused by an air bearing slider (ABS) structure, rotational windage loss at radial positions on the magnetic disk, the value of the negative pressure, and the surface roughness of the magnetic disk.

Accordingly, when the flying height of the head becomes smaller, the HDI margin with respect to the magnetic space becomes narrower, and there is a possibility of a head crash. When the head collides with the surface of the magnetic disk, there is a possibility that a read error (thermal asperity) is caused by the heat generated by the collision. Furthermore, there is a possibility that some of the lubricant agent applied onto the surface of the magnetic disk moves on to the head due to contact between the head and the magnetic disk.

On the other hand, when the flying height of the head becomes larger, there are possibilities that the electromagnetic conversion characteristics efficiency becomes lower due to a magnetic space expansion, the reproduced output becomes lower, a read error is caused, and a seek error is caused by a servo signal read error.

To counter this problem, a technique has been recently suggested to control the flying height in the HDD. For example, Japanese Patent Application Publication No. 2005-71546 discloses a method for controlling a protrusion (a thermal protrusion) on the head floating face with respect to the magnetic disk. Also, Japanese Patent Application Publication Nos. 2003-168274, 2003-272335, 2006-4474, and 2006-18987 disclose methods for controlling the flying height of the head with respect to the magnetic disk by controlling heat generation of a heater. Japanese Patent Application Publication No. 10-241333 discloses a method for preventing thermal asperity by removing protrusions from the magnetic disk surface. Japanese Patent Application Publication No. 11-185210 discloses a method for detecting thermal asperity.

In recent years, the perpendicular magnetic recording method is used so as to maintain a stable recording state against a heat fluctuation phenomenon. By the perpendicular magnetic recording method, there is a stronger correlation between the write characteristics (the overwrite characteristics) and the read margin. Accordingly, the variation of the write characteristics caused by the variation of the flying height has greater influence on the read margin.

In conventional cases, however, the above described influence on the hard disk device is not taken into consideration when the head is controlled. As the recording density is becoming even higher in the future, there is fear that the influence on the data reading and writing performances and the likes in each hard disk device will become even greater.

SUMMARY

According to an aspect of the present invention, a head flying height control method includes: detecting contact of a head having a heater with a corresponding storage medium, and associating the amount of heat generated by the heater when the contact is detected with a situation where a flying height of the head is zero; measuring at least one type of characteristics that are saturation characteristics of a read margin of data written on the storage medium by the head, and saturation characteristics of electromagnetic conversion characteristics of the head, the measuring being carried out every time the flying height of the head is varied, with a reference being the situation where the flying height of the head is zero, a current used for writing the data being a parameter in the saturation characteristics; and adjusting the flying height of the head, based on a measurement result of the measuring.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 15A through 15C illustrate disturbances in the head output read waveform caused by a decrease in head flying height and the minute protrusions;

FIGS. 20A and 20B depict a heater power map formed with heater power values observed when read requests are made, and a heater power map formed with heater power values observed when write requests are made;

DESCRIPTION OF EMBODIMENTS

The following is a detailed description of a hard disk drive (HDD) in accordance with an embodiment of the present invention, with reference to FIGS. 1 through 22.

Figure 1:
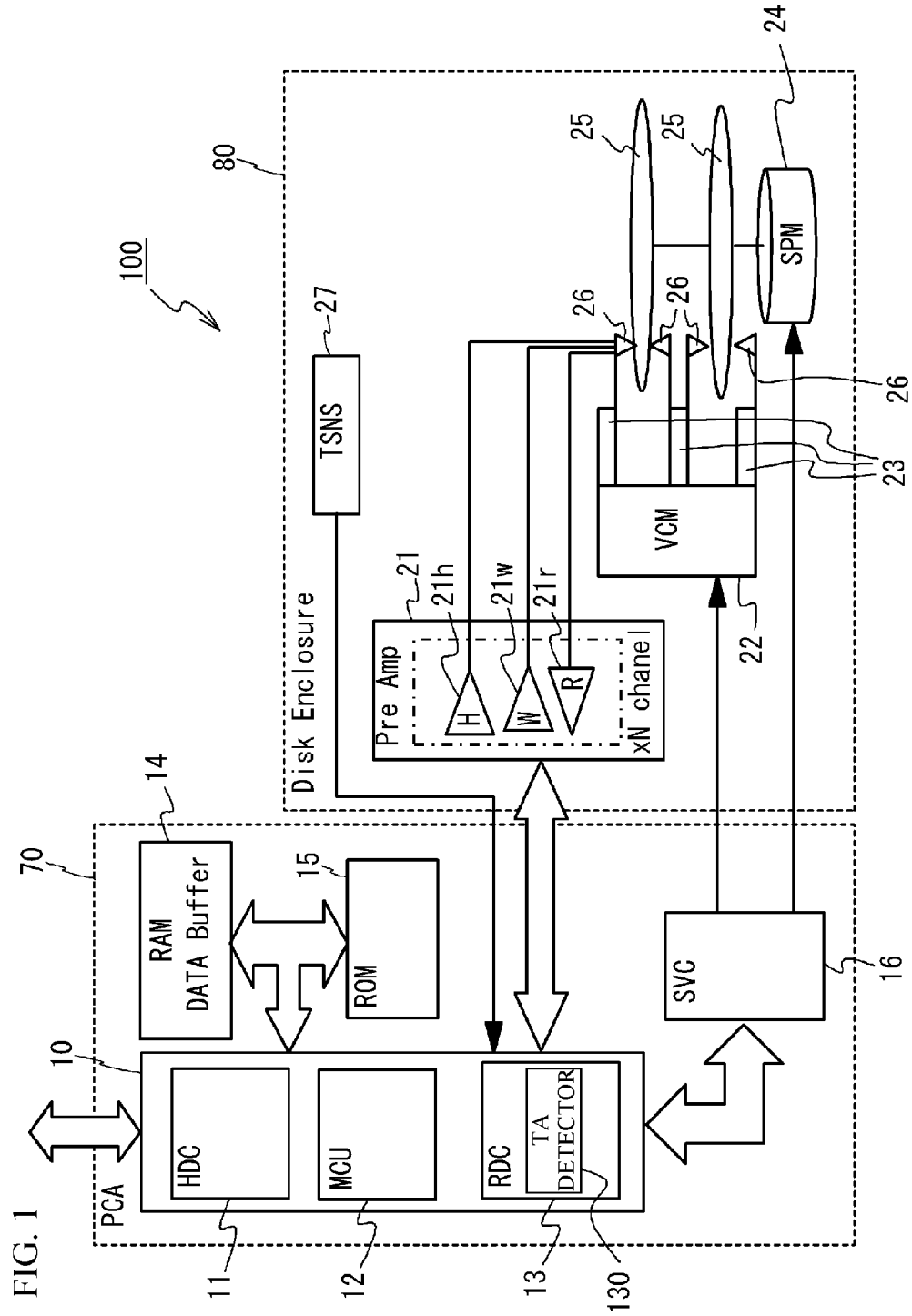
FIG. 1 is a block diagram depicting the fundamental structure of a storage device in accordance with an embodiment of the present invention.

FIG. 1 is a block diagram depicting the fundamental structure of the hard disk drive (HDD) in accordance with an embodiment. As depicted in FIG. 1, the HDD 100 includes a printed circuit assembly (PCA) 70 that controls the entire HDD 100 and transmission and reception with a host device (not depicted) via a host interface, and a disk enclosure (DE) 80.

The PCA 70 includes a hard disk controller (HDC) 11, a micro control unit (MCU) 12, a read channel (RDC) 13, a RAM 14, a ROM 15, and a servo control circuit (SVC) 16.

The HDC 11 performs interface protocol control, data buffer control, disk format control, and the likes. The MCU 12 performs arithmetic operations, to control the HDC 11, the RDC 13, and the SVC 16, and to manage the memories in the HDD 100 such as the RAM 14, the ROM, 15. The RDC 13 performs data writing and reading operations (including data modulating and demodulating operations) on magnetic disks 25 used as recording media. The RDC 13 has the later described HSC function (a harmonics sensor circuit) built therein. The HDC 11, the MCU 12, and the RDC 13 form a control unit 10. The RAM 14 stores various kinds of data including intermediate data of the arithmetic operations performed by the MCU 12. The ROM 15 stores programs to be executed by the MCU 12, data, and the likes. The SVC 16 controls a voice coil motor (VCM) 22 and a spindle motor (SPM) 24 in the DE 80.

The DE 80 includes a preamplifier unit 21, the VCM 22, actuators 23, the SPM 24, magnetic disks 25, perpendicular magnetic recording heads 26, and a temperature sensor (TSNS) 27. In FIG. 1, two magnetic disks 25 are provided, and a pair of heads 26 are provided for each of the magnetic disks 25, for ease of explanation. However, the number of magnetic disks 25 and the number of heads 26 are not limited to those depicted in FIG. 1. For example, one head 26 may be provided for each of more than two magnetic disks 25, or at least one head 26 may be provided for one magnetic disk.

Figure 2:
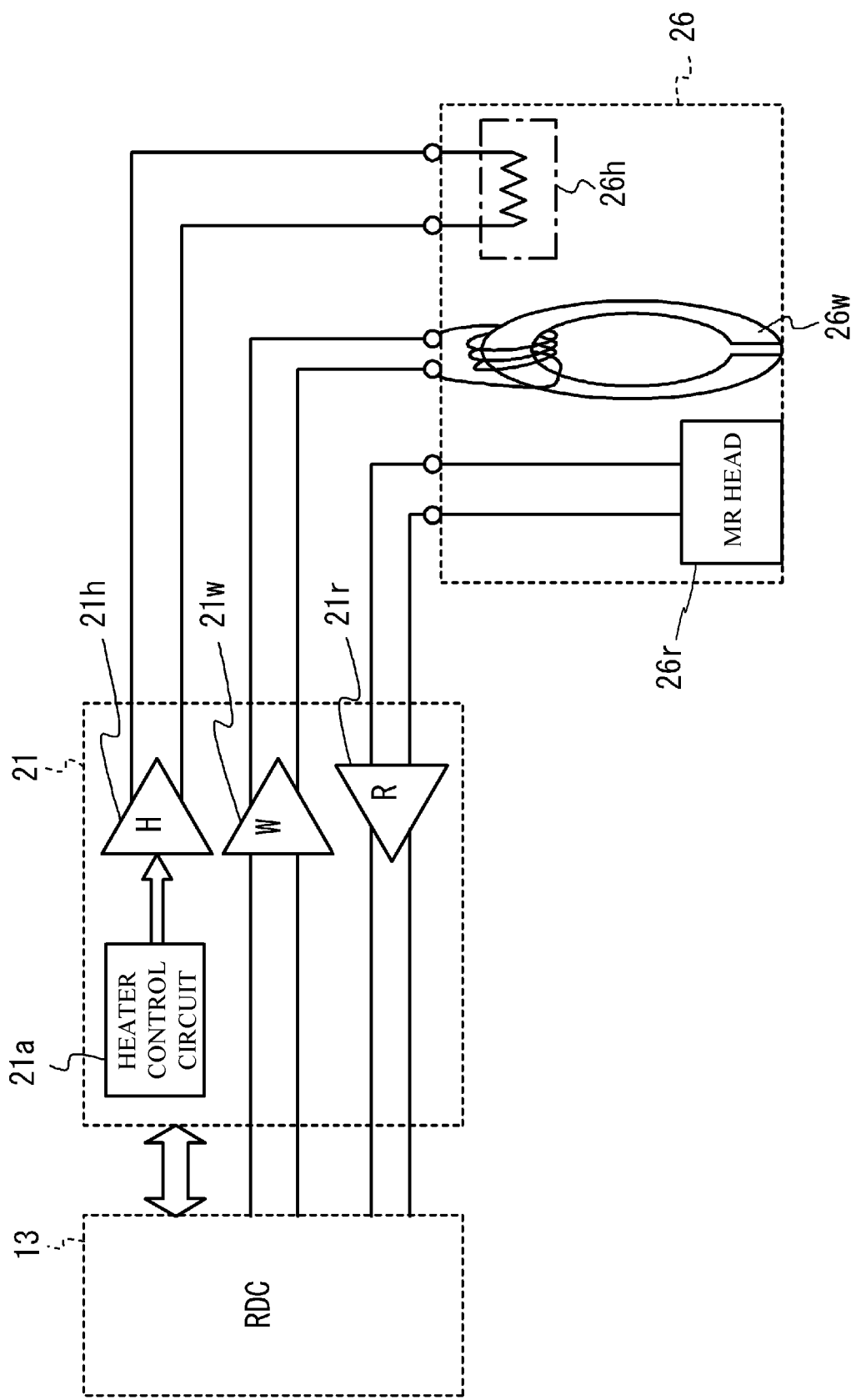
FIG. 2 depicts the internal structure of a head, as well as the RDC and the preamplifier unit.

The preamplifier unit 21 includes write drivers 21w that amplify write signals and supply them to the heads 26, read preamplifiers 21r that amplify read signals from the heads 26, and heater drivers 21g that drive heaters (not depicted) provided in the heads 26. The number of write drivers 21w, the number of read preamplifiers 21r, and the number of heater drivers 21h in the preamplifier unit 21 is equal to the channel number N that is equivalent to the number N of heads 26. As depicted in FIG. 2, the preamplifier unit 21 further includes a heater control circuit 21a (not depicted in FIG. 1).

The VCM 22 drives the actuators 23 that support the heads 26. The SPM 24 rotates the magnetic disks 25.

FIG. 2 depicts the internal structure of one of the perpendicular magnetic recording heads 26, as well as the RDC 13 and the preamplifier unit 21. As depicted in FIG. 2, the heater control circuit 21a is provided inside the preamplifier unit 21, and the head 26 includes a read head (a MR head) 26r, a write head (an inductive head) 26w, and a heater 26h. The read head 26r reads a read signal from one of the magnetic disk 25. The read signal read by the read head 26r is amplified by the read preamplifier 21r, and is supplied to the RDC 13.

Figure 3:
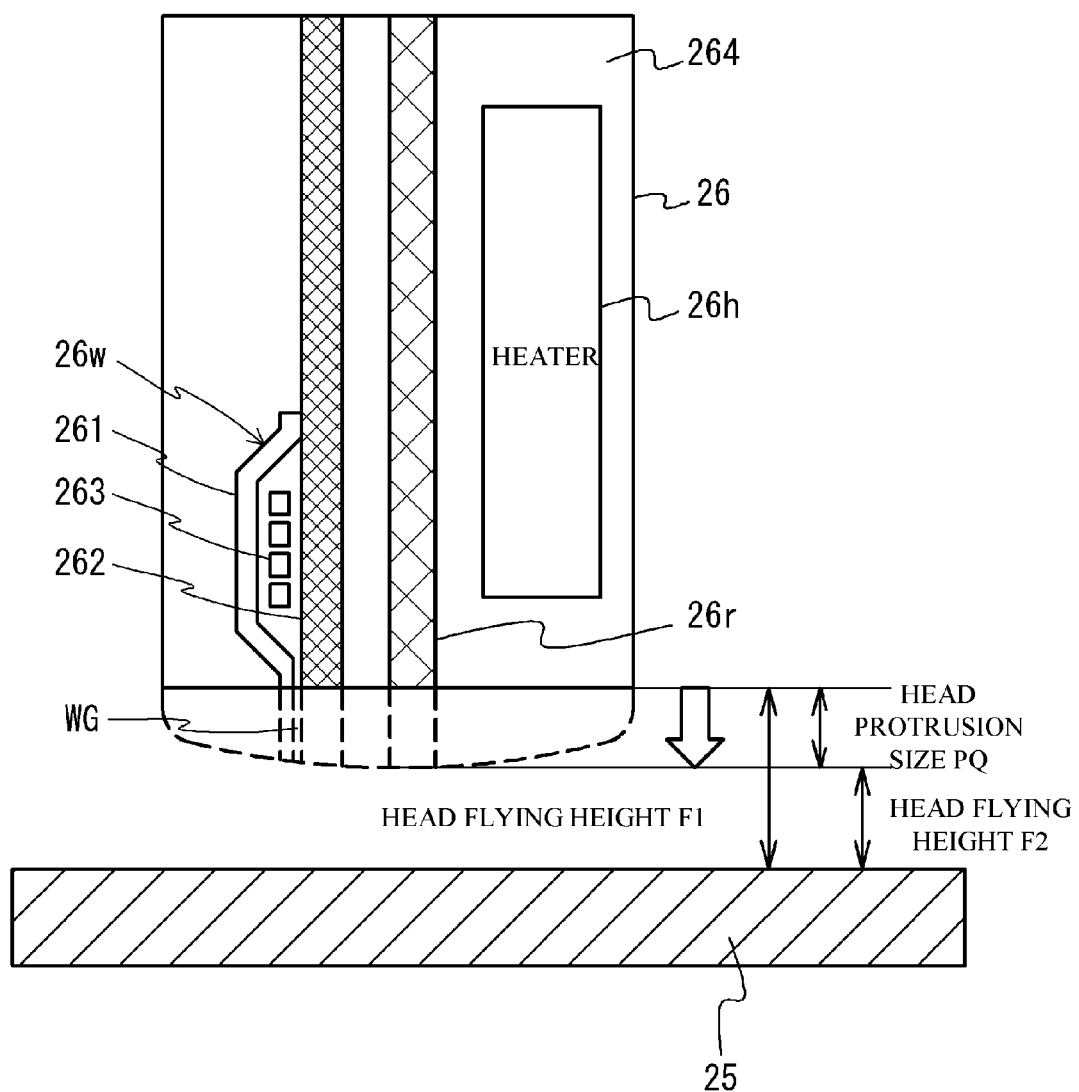
FIG. 3 is a cross-sectional view depicting the components of the head.

The write head 26w receives a write signal from the RDC 13 via the write driver 21w, and writes the write signal onto the magnetic disk 25. More specifically, the write head 26w is a structure that has a coil 263 wound around an upper magnetic pole 261 and a lower magnetic pole 262, as depicted in FIG. 3, which is a cross-sectional view of the head 26. In the write head 26w, a magnetic field in accordance with a current applied to the coil 263 is induced at a write gap WG, and the write signal is written on the magnetic disk 25 by the magnetic field.

The heater 26h has its heat generation controlled by the heater control circuit 21a via the heater driver 21h. More specifically, the heater 26h has its heat generation controlled with an applied heater current, and the respective components of the head 26 including a head resin portion 264 depicted in FIG. 3 thermally expand in the direction indicated by the outlined arrow in FIG. 3 in accordance with the controlled amount of heat generation. The thermal expansion is caused, as the floating face of the head 26 (the lowermost face of the head 26 in FIG. 3) expands toward the magnetic disk 25 (downward in FIG. 3). Accordingly, the amount of thermal expansion is also called the head protrusion size.

Figure 4:
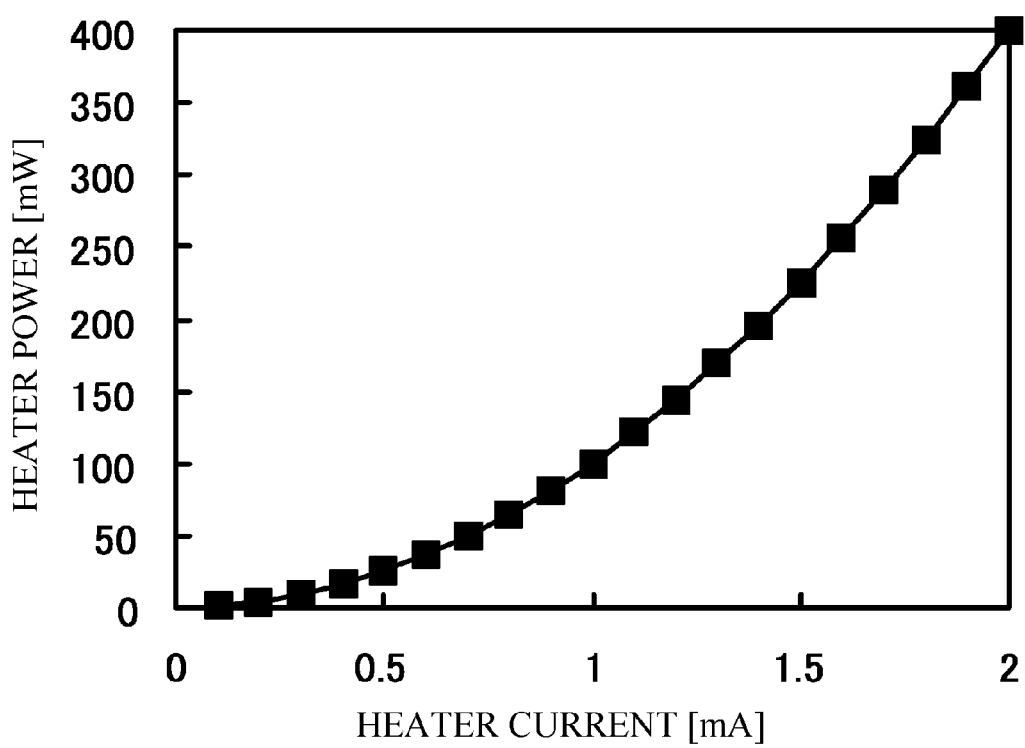
FIG. 4 depicts the relationship between the heater current and the heater power where the resistance value of the heater is 100 Ω.
Figure 5:
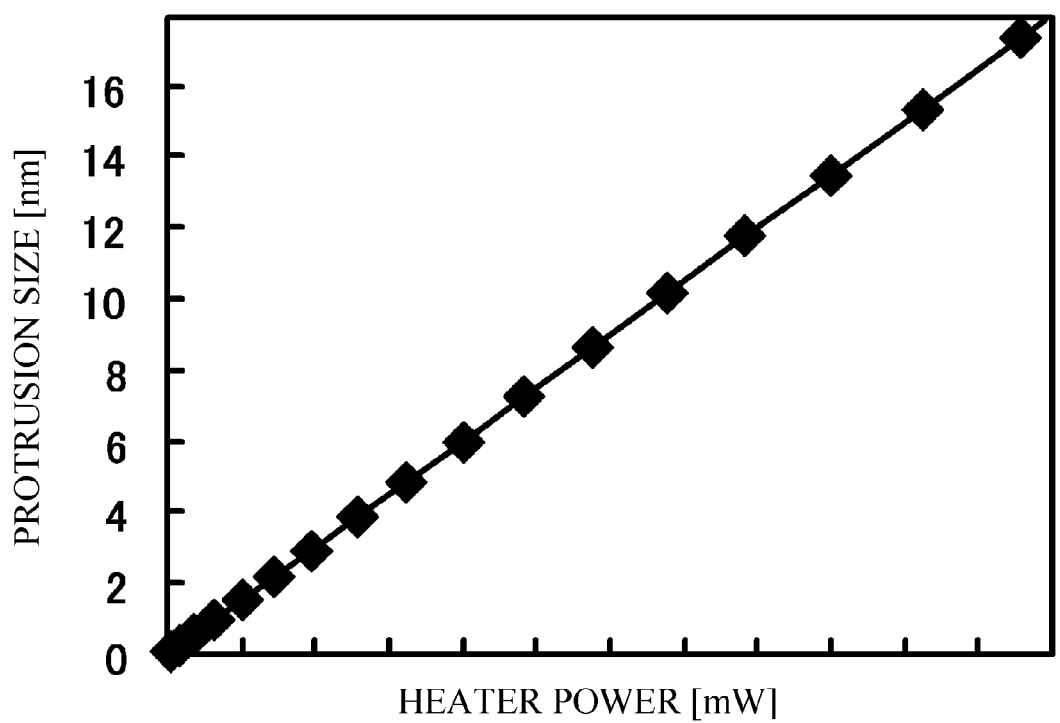
FIG. 5 depicts the relationship between the heater power of the heater and the head protrusion size.

FIG. 4 depicts the relationship between the heater current and the heater power where the resistance value of the heater 26h is 100 Ω. FIG. 5 depicts the relationship between the heater power of the heater 26h and the head protrusion size.

Normally, a head maintains the head flying height F1 depicted in FIG. 3. On the other hand, by applying a heater current to the heater 26h, thermal expansion is caused in accordance with the heater current (see FIG. 4), and a head protrusion appears (see FIG. 5). As depicted in FIG. 3, when a head protrusion PQ appears, the flying height of the head 26 is a head flying height F2 that is smaller than the head flying height F1 by the size of the head protrusion PQ.

The relationship depicted in FIG. 5 exists between the heater power α and the head protrusion size β, and is expressed by the following equation (1):

$$\beta = 0.06 \times \alpha - 2^{-15} \quad (1)$$

Between the heater power α and the difference between the head protrusion size β observed when the head flying height is zero and the target head flying height γ, there is the relationship expressed by the following equation (2), which represents the inverse operation of the equation (1):

$$\alpha = [(\beta-\gamma)+2^{-15}]/0.06 \quad (2)$$

In a case where the heater power α is 200 mW, for example, the head protrusion size β is 12 nm. If this situation is a situation where the head flying height is zero, the heater power α should be set at 33 mW according to the equation (2), so as to set the flying height γ at 10 nm.

After the heater power α is determined according to the equation (2), the heater current to be actually set can be calculated based on the heater power α and the relationship depicted in FIG. 4.

Figure 6:
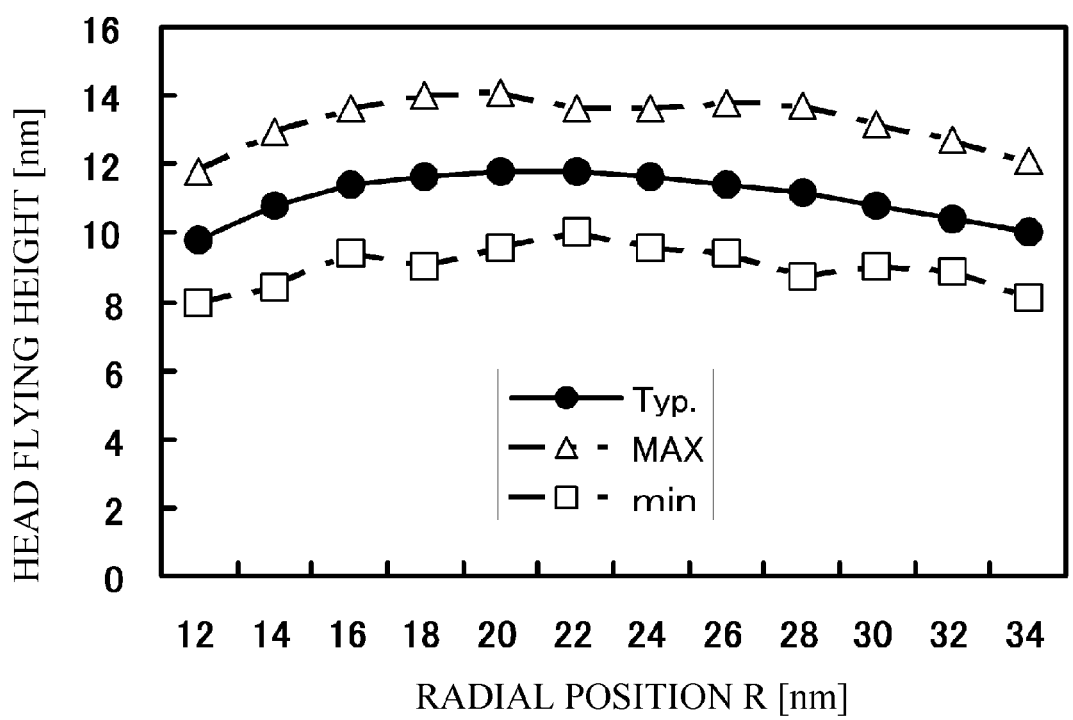
FIG. 6 depicts an example of the head flying height that varies with radial positions on a magnetic disk.

Even when not particularly controlled, the head flying height varies with the radial position R on the magnetic disk 25, as depicted in FIG. 6 (In FIG. 6, ● represents the typical head flying height, Δ represents the largest head flying height, and □ represents the smallest head flying height). This is because the negative pressure varies with the floating position of the head 26, windage loss caused by wind disturbance, or the like. Also, the flying height of the head 26 also varies within the range from the largest head flying height and the smallest head flying height, as depicted in FIG. 6, even though it is at the same radial position.

Figure 7:
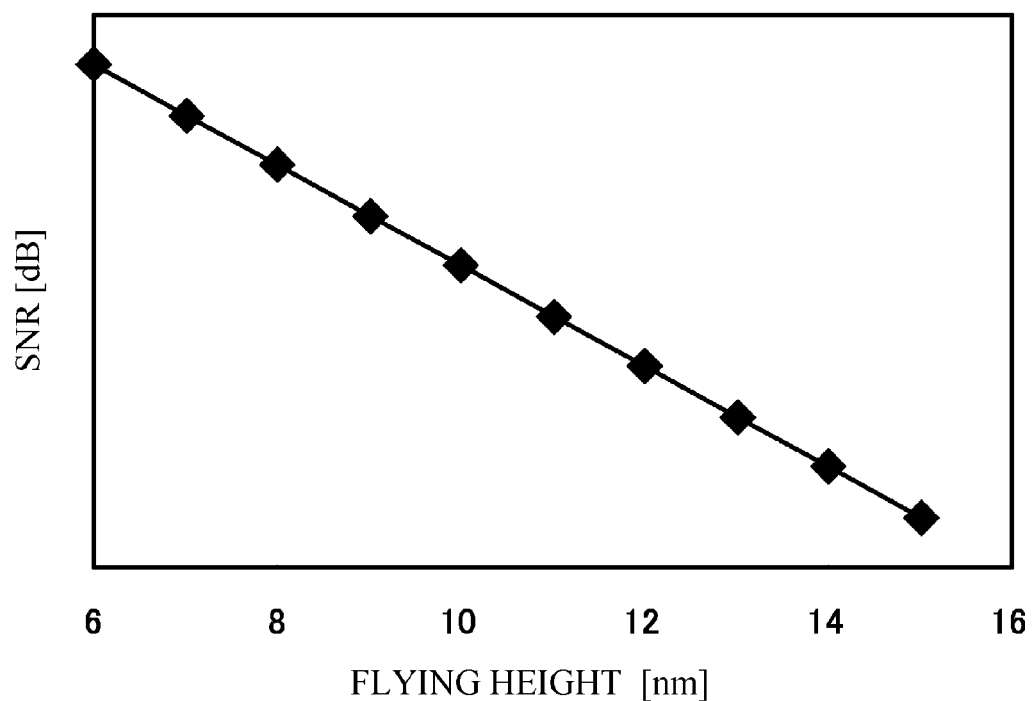
FIG. 7 depicts the relationship between the head flying height that varies and the SNR of read signals read by the read head.
Figure 8:
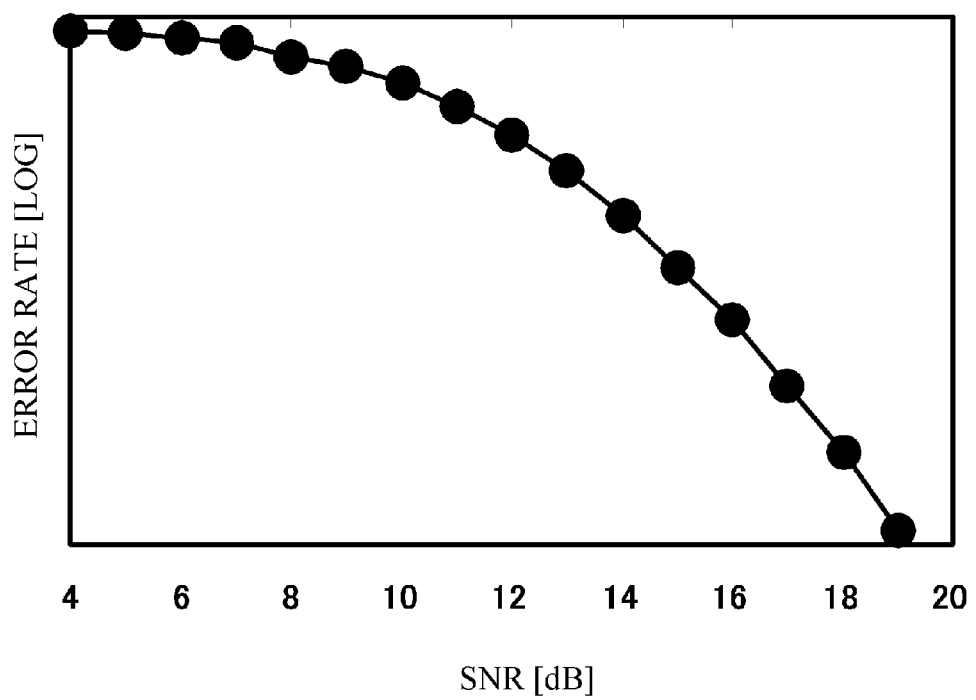
FIG. 8 depicts the relationship between the SNR and the error rate of read signals.

Next, the relationships among the head flying height, the S/N ratio (SNR), and the error rate are described. FIG. 7 depicts the relationship between the head flying height that varies and the SNR of a read signal read by the read head 26r. FIG. 8 depicts the relationship between the SNR and the error rate of the read signal.

As can be seen from FIG. 7, when the head flying height becomes larger, the SNR becomes lower. When the head flying height becomes smaller, the SNR becomes higher to improve the signal quality. As can be seen from FIG. 8, when the SNR becomes higher, the error rate or the error probability of the read signal (data) becomes lower to improve the signal quality. When the SNR becomes lower, the error rate becomes higher to degrade the signal quality. As can be seen from FIGS. 7 and 8, when the head flying height becomes smaller, the error rate becomes lower to improve the signal quality. When the head flying height becomes larger, the error rate becomes higher to degrade the signal quality.

Figure 9:
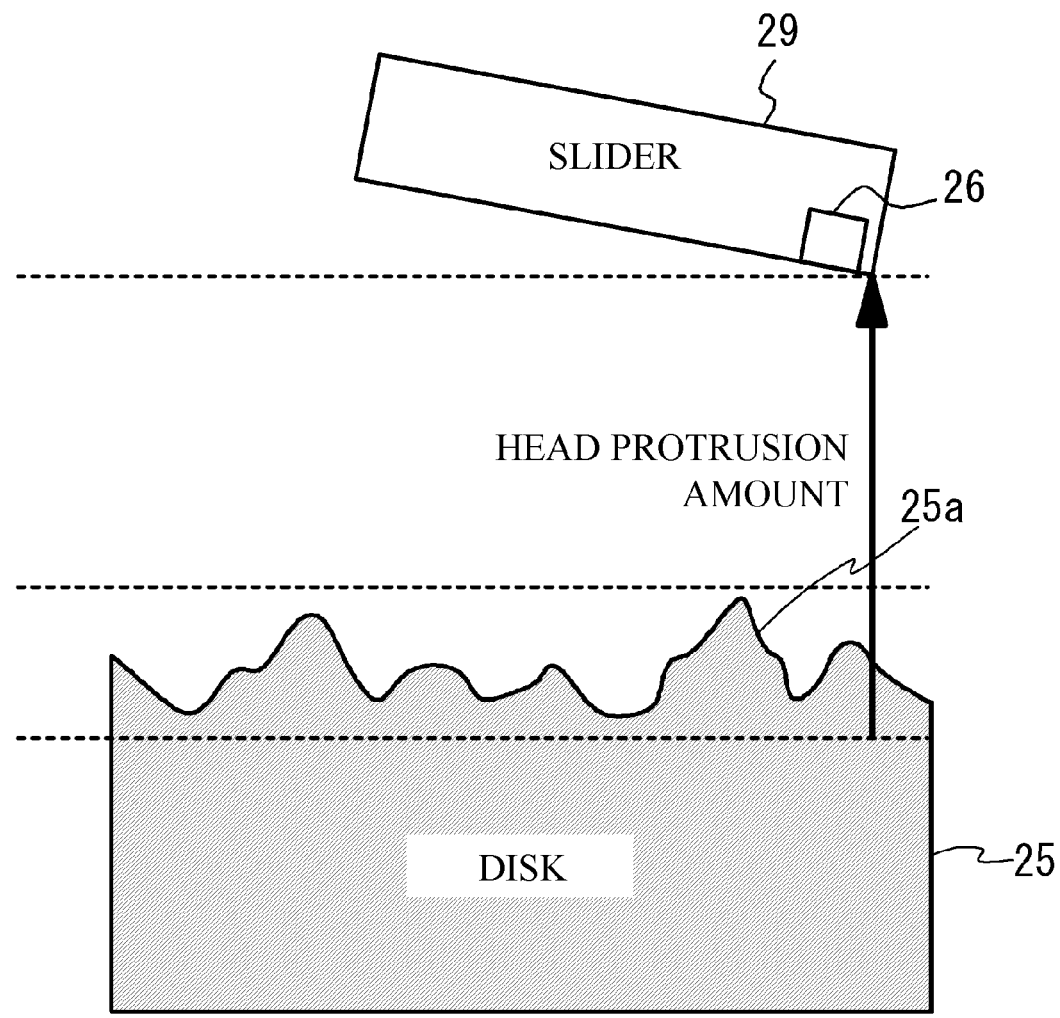
FIG. 9 illustrates the relationship between the slider to which the head is attached and the magnetic disk.
Figure 10A:
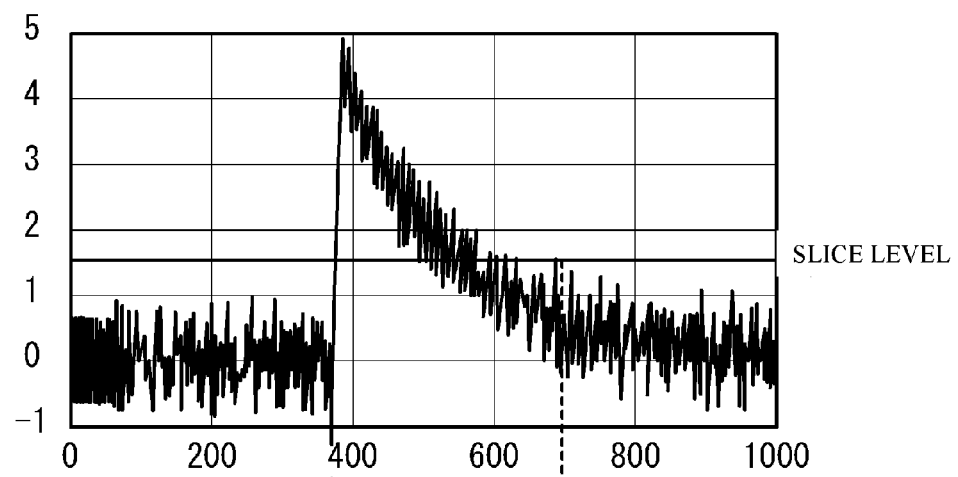
FIGS. 10A through 10C illustrate thermal asperity.
Figure 10B:
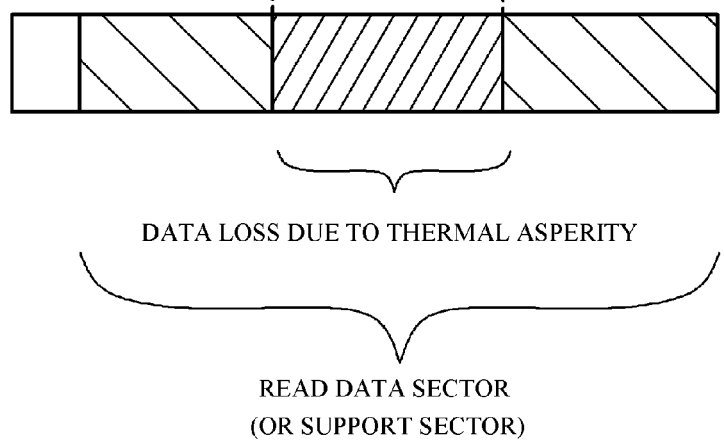
Figure 10C:
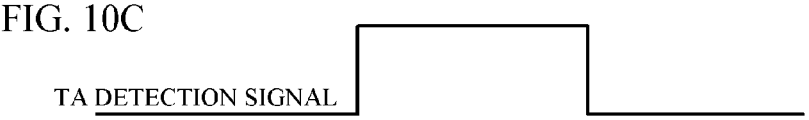

The surface of the magnetic disk 25 is flat, when observed through macro observation. When observed through micro observation, however, there is surface roughness in the surface of the magnetic disk 25, as depicted in FIG. 9 (which depicts the relationship between the magnetic disk 25 and a slider 29 to which the head 25 is mounted). The surface roughness depends on the texture processing technique, the polishing technique (medium polishing), or the like. There are a number of minute protrusions 25a in the rough surface depicted in FIG. 9. When the head flying height becomes smaller or in a case where relatively large protrusions exist, the head 26 might collide with the protrusions to cause thermal asperity (TA). Thermal asperity is a phenomenon that changes the resistance value of the read head 26r with the thermal energy (or the thermal response) generated when the head 26 collides with the protrusions 25a. Referring now to FIGS. 10A through 10C, the thermal asperity is described in greater detail.

FIG. 10A is a graph depicting the read signal (the ordinate axis indicating the amplitude of the read signal, the abscissa axis indicating time). FIG. 10B depicts a data sector (or a servo sector). FIG. 10C depicts a TA detection signal (a signal extracted by providing the slice level depicted in FIG. 10A). The thermal response in the thermal asperity has response characteristics that gradually attenuate after causing direct-current voltage offset (DC offset) in the read signal, as depicted in FIG. 10A.

Here, if the read signal depicted in FIG. 10A is a data sector, data loss is caused as depicted in FIG. 10B, and a read error is detected accordingly. The thermal asperity can also be sensed with the use of the TA detection signal of FIG. 10C. The thermal asperity detection method is disclosed in Japanese Unexamined Patent Publication No. 11-185210.

In this embodiment, the TA detector 130 in the RDC 13 depicted in FIG. 1 detects thermal asperity, and generates the TA detection signal of FIG. 10C. The TA detection signal is transmitted to the MCU 12 depicted in FIG. 1, and the MCU 12 recognizes the thermal asperity.

In this embodiment, thermal asperity is actively used to determine that the head flying height is zero. More specifically, with the use of the heater 26h, the head 26 is caused to have a large protrusion, so as to reduce the head flying height. Where the MCU 12 senses thermal asperity, the head flying height is determined to be zero.

Figure 11:
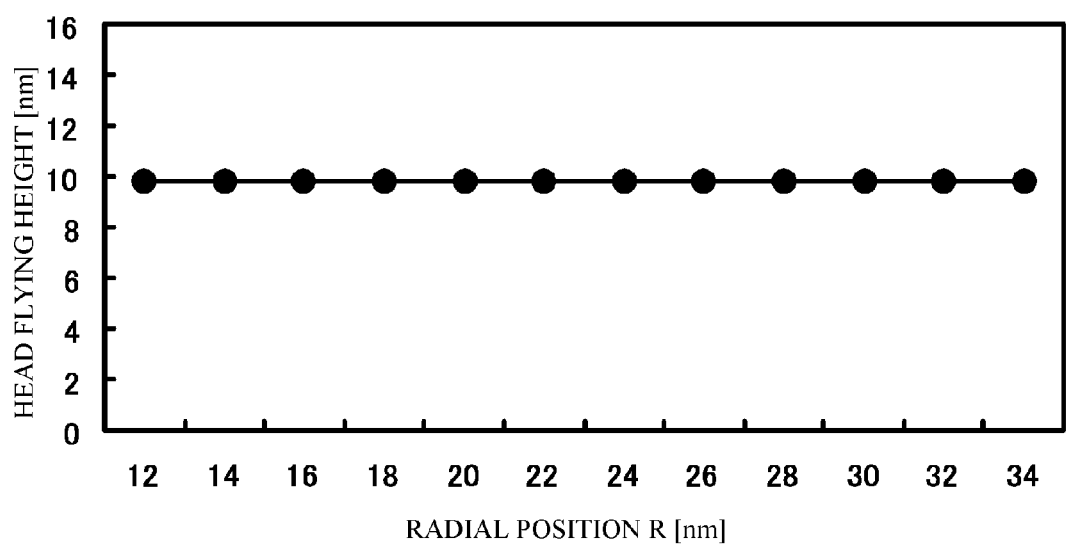
FIG. 11 illustrates a case where a target head flying height is set for each head.
Figure 12:
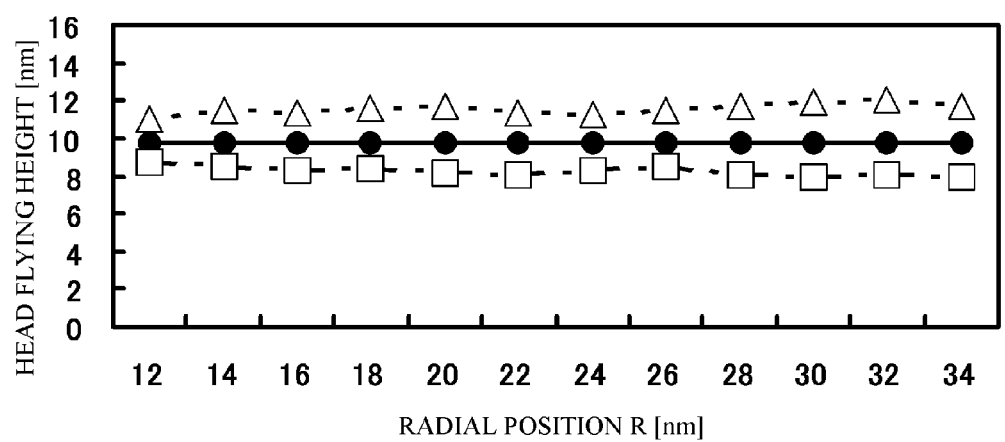
FIG. 12 is a graph equivalent to the graph of FIG. 6 in a case where the settings illustrated in FIG. 11 are performed.

In this embodiment, a target head flying height (that is substantially constant, regardless of radial positions R) can be set for each radial position R, as depicted in FIG. 11. With this arrangement, the largest head flying height (represented by Δ) and the smallest head flying height (represented by □) can be made substantially constant, regardless of radial positions, as depicted in FIG. 12.

Figure 13:
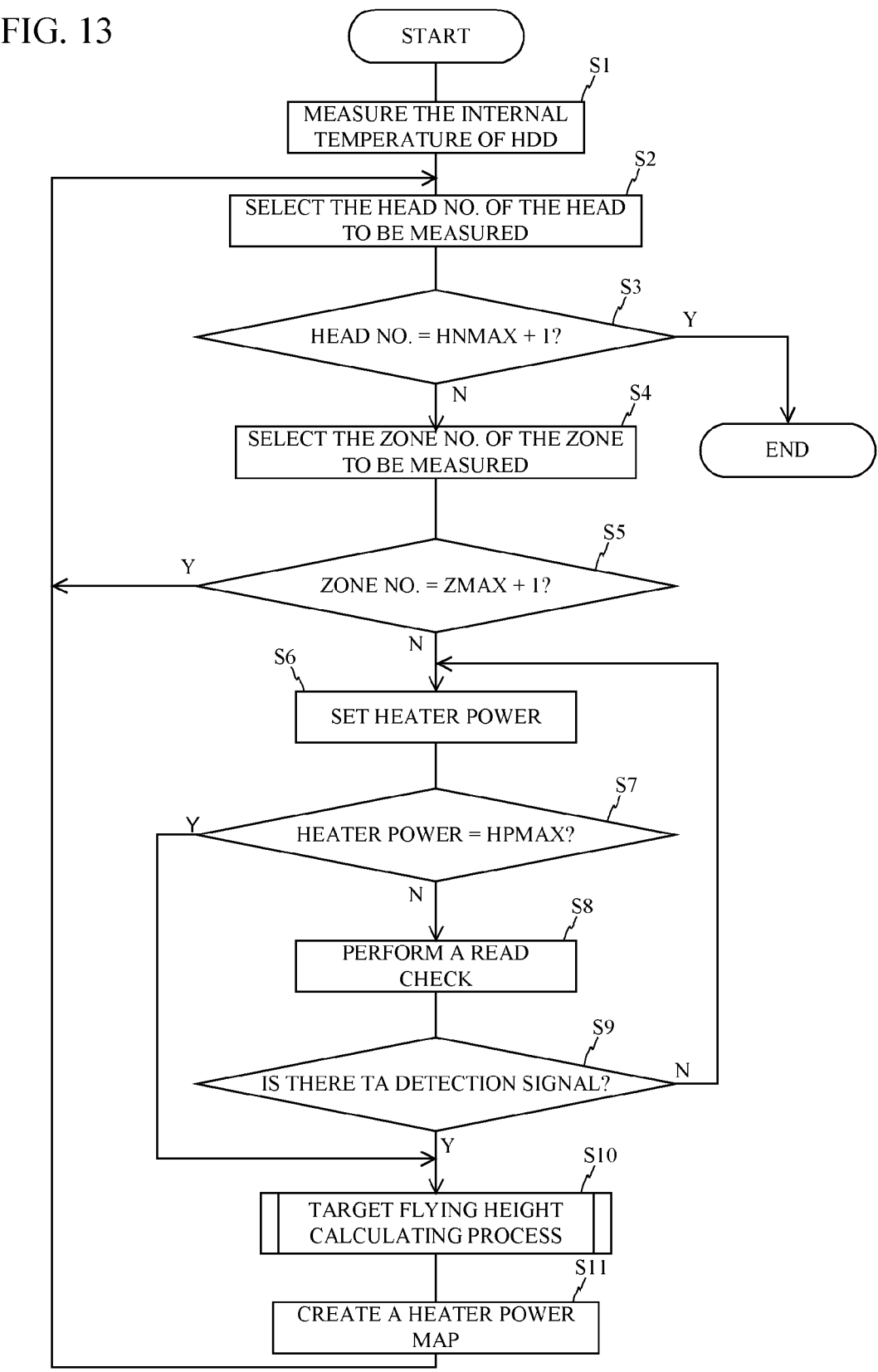
FIG. 13 is a flowchart depicting the operation to create heater power maps in accordance with the embodiment.

Referring now to the flowchart depicted in FIG. 13, the operation (the processing) in accordance with this embodiment is described. The operation illustrated in FIG. 13 is performed by the MCU 12 of FIG. 1 executing a program stored in the ROM 15 or the RAM 14, for example.

The operation illustrated in FIG. 13 is performed to determine the heater power to be set for controlling the head flying height for each head 26 in the HDD 100, for each region (each zone) on the magnetic disk 25 in the zone bit recording (ZBR) format, and for each temperature around the head (each internal temperature of the HDD 100).

The operation illustrated in FIG. 13 is also an operation to be performed in the test procedure that is carried out before the HDD 100 as a product is shipped from the factory, for example. The operation illustrated in FIG. 13 is not limited to that, and may be performed when automatic adjustment calibration is carried out after shipment, for example.

At step S1 of FIG. 13, the temperature sensor 27 measures the internal temperature of the HDD 100. For example, the internal temperature of the HDD 100 may be measured at three points of a high temperature, room temperature, and a low temperature, or may be measured at certain temperature intervals (at 5° C. intervals, for example) in a predetermined temperature range (a temperature range from 0° C. to 60° C., for example).

At step S2, the head 26 to be measured is selected by designating the smallest head number among the head numbers allotted to the remaining heads, for example. At step S3, a check is made to determine whether the head number is larger by "1" than the largest head number $HN_{MAX}$ among the head numbers allotted to the heads 26 in the HDD 100. If the result of this determination is positive, measurement has already been carried out on all the heads 26 in the HDD 100, and the operation comes to an end. In other words, when the measurement of all the heads 26 in the HDD 100 and all the zones on the magnetic disk 25 is ended, the operation illustrated in FIG. 13 comes to an end.

If the result of the determination at step S3 is negative, the operation moves on to step S4, and a zone on the magnetic disk 25 to be measured is selected by designating the smallest zone number (zone NO.).

At step S5, a check is made to determine whether the zone number is larger by "1" than the largest zone number $Z_{MAX}$ on the magnetic disk 25. If the result of this determination is positive, the operation returns to step S2. If the result of this determination is negative, the operation moves on to step S6. At step S6, the heater power of the heater 26h is set in the heater control circuit 21a.

At step S7, a check is made to determine whether the heater power is the maximum heater power $HP_{MAX}$. If the result of this determination is positive, the operation moves on to step S10. If the result of the determination at step S7 is negative, the operation moves on to step S8.

At step S8, test data and the likes are recorded on the magnetic disk 25 via the write head 26w of the head 26, and a read check is performed by reading the test data and the likes with the read head 26r. At step S9, a check is made to determine whether a TA detection signal is sensed in the RDC 13. The TA detection signal is generated when thermal asperity is detected by the TA detector 130. Here, it can be considered that the check at step S9 is made to determine indirectly whether the head flying height is zero. If the result of this determination is negative, the operation returns to step S6. If the result of the determination at step S9 is positive, the operation moves on to step S10. When the procedures described so far (steps S1 through S9) are completed, the heater current (or the heat amount) of the heater 26h is associated with a situation where the head flying height is zero.

At step S10, a target head flying height is calculated, with the situation where the head flying height is zero being a reference. At step S11 following step S10, a heater power map is created with the use of the result of the processing at step 10. After the procedure of step S11 is completed, the operation returns to step S2. The procedures of steps S10 and S11 will be described later in detail.

At step S9 illustrated in FIG. 13, a check is made to determine indirectly whether the head flying height is zero by determining whether the TA detection signal is detected. However, the present invention is not limited to that, and whether the head flying height is zero may be determined based on whether a read error is sensed. In the following, this alternative operation is described.

Figure 14A:
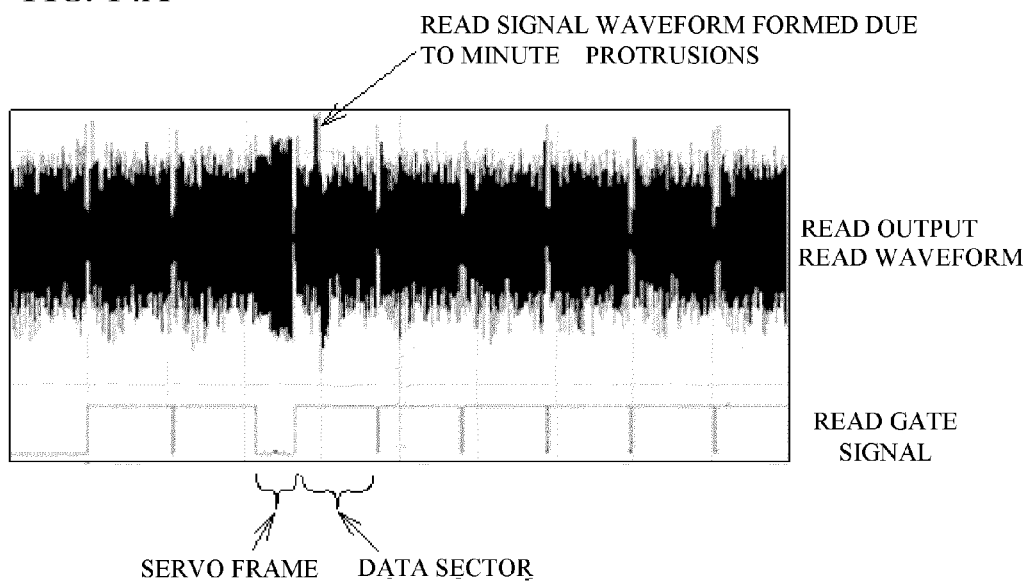
FIGS. 14A through 14C illustrate an example of the head output read waveform observed in a case where the head flying height is reduced due to the heating by the heater, and the head collides with minute protrusions existing on the magnetic disk.
Figure 14B:
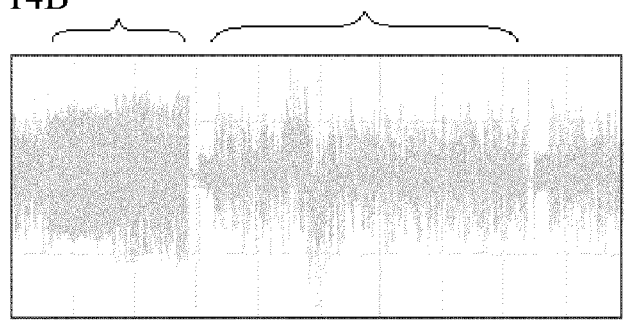
Figure 14C:
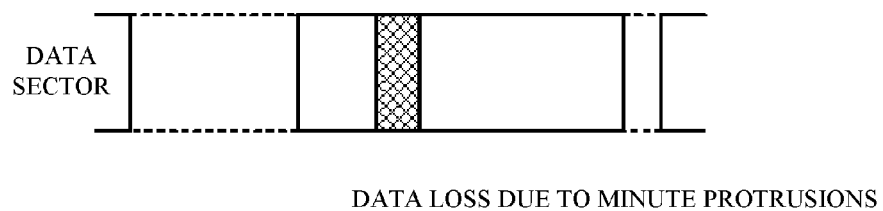
Figure 15A:
Figure 15B:
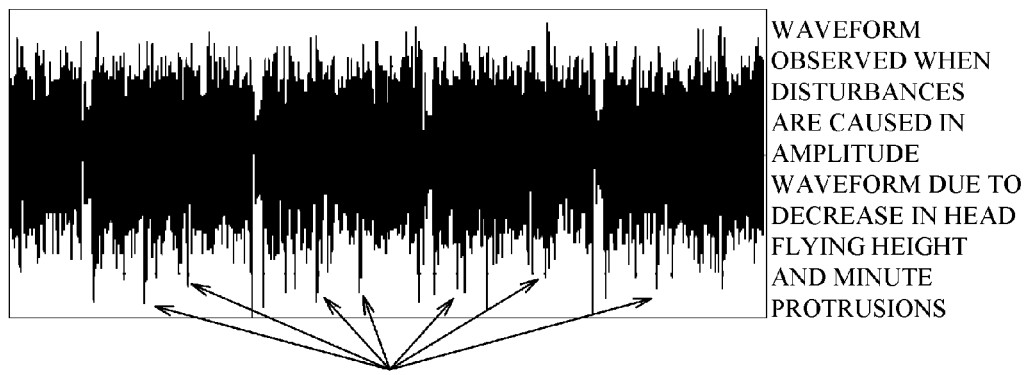
Figure 15B:
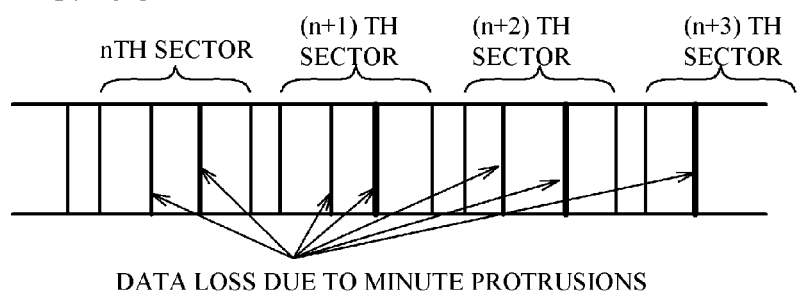

The waveform of the read signal depicted in FIG. 10A is an example observed where the head 26 collides with very large protrusions. In practice, however, many protrusions 25a exist on the magnetic disk 25, and those protrusions 25a vary in height as depicted in FIG. 9. FIG. 14A depicts the waveform of the read signal that is read where the head 26 collides with such protrusions 25a of various heights, and the read gate signal for extracting servo information and data that are read by the RDC 13. FIG. 14B depicts an enlarged view of the servo frame and the data sector of the head output read waveform depicted in FIG. 14A. FIG. 14C depicts the data loss caused by the protrusions 25a in the data sector. As can be seen from those drawings, the amplitude value of the head output read waveform is large in this example, but is not much different from the amplitude value of the head output read waveform in a normal case where the head 26 does not collide with the protrusions on the magnetic disk 25. Therefore, it is difficult to precisely detect contact of the head 26 with minute protrusions 25a on the magnetic disk 25 with the use of the slice level depicted in FIG. 10.

In a case where contact of the head 26 with the protrusions 25a on the magnetic disk 25 is to be detected with high precision, a check is made to determine whether there is a read error at step S9 of FIG. 13. In such a case, an ECC correcting function (such as an on-the-fly ECC correcting function) is normally made valid in the read check to be performed at step S8, but the correcting capability of the ECC correcting function may be lowered. For example, if the correcting capability is 20 bytes, an error smaller than that cannot be detected. Therefore, the correcting capability may be set as close as possible to zero. It is also possible to employ the following algorithm: in a case where the correcting capability is lowered stepwise during the read check procedure, and a read error is detected when the correcting capability is at a certain level, the read error is determined to have been caused by contact of the head 26 with the minute protrusions 25a on the magnetic disk 25 according to the algorithm.

When the head 26 comes into contact with the large number of protrusions 25a on the magnetic disk 25, many disturbances are caused in the head output read waveform. Due to the waveform disturbances, data loss is caused in the data sector. More specifically, where the head 26 is not in contact with the magnetic disk 25, the regular read signal read by the head 26 has the waveform (the head output read waveform) depicted in FIG. 15A. When the head 26 comes into contact with the protrusions 25a, the read signal has the waveform depicted in FIG. 15B. In this case, there are one or two data loss spots in each of the nth through (N+3)th sectors, as can be seen from FIG. 15C. In some cases, the data loss can be compensated by the ECC correcting function, but, in most cases, the data loss cannot be compensated. However, it is possible to use a method of lowering the correcting capability beforehand or a method of lowering the correcting capability stepwise at the time of the read check, with the cases where data loss can be compensated being taken into consideration. In such a case, when a read error is detected with correcting capability of a certain level, the read error can be determined to have been caused by contact of the head 26 with the protrusions 25a.

Next, the procedure of step S10 of FIG. 13 (the target head flying height calculating procedure) and the procedure of step S11 (the heater power map creating procedure) are described in detail.

In a case where the perpendicular magnetic recording (PMR) method is used as in this embodiment, the error rate is not determined only by the S/N ratio (SNR), but is affected by the write characteristics of the magnetic disk 25 or the connecting capability among the bit strings arranged in a direction perpendicular to the plane of the magnetic disk 25, as can be seen from the above observations. The write characteristics of the magnetic disk 25 are measured as overwrite characteristics.

Figure 16:
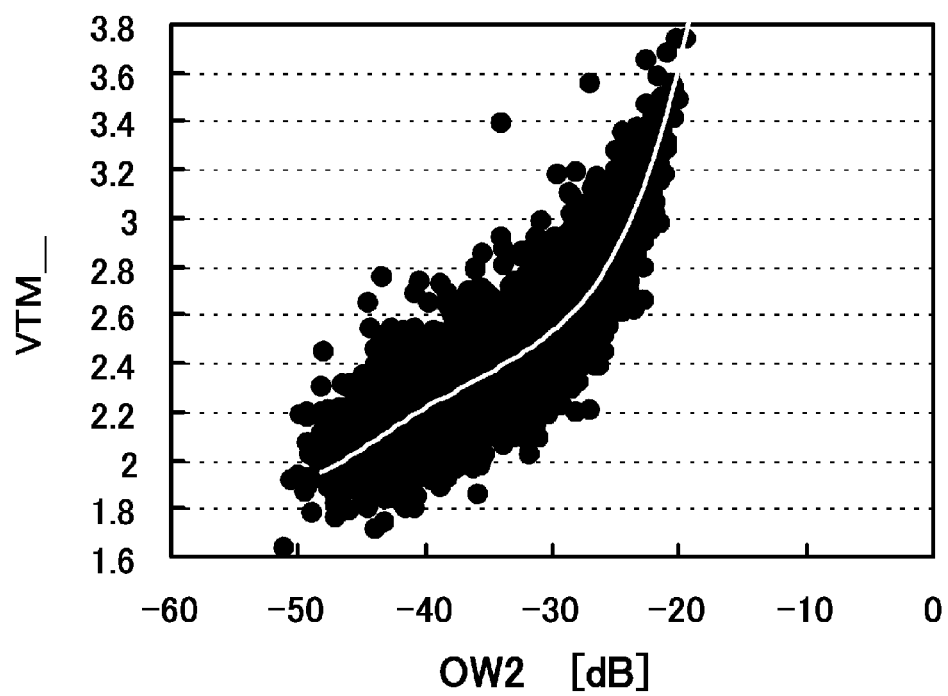
FIG. 16 depicts a correlation between the overwrite characteristics and the VTM.

As depicted in FIG. 16, the overwrite characteristics (OW2) exhibit a small variation, but has a correlation with the VTM (Viterbi trellis margin). As the value on the abscissa axis becomes larger, the overwrite characteristics (OW2) become poorer. As the value on the ordinate axis becomes larger, the error rate becomes higher, since the VTM represented by the ordinate axis is correlated to the error rate. Accordingly, FIG. 16 indicates that the error rate becomes lower as the overwrite characteristics become more improved.

The overwrite characteristics (OW2) are defined by the following equation (3):

$$OW2 = Y - X \quad (3)$$

where X [dB] represents the signal component level of the frequency that is first written on the magnetic disk 25, and Y [dB] represents the remaining component level of the frequency signal that is first written after overwriting is performed on the magnetic disk 25 at a different frequency.

According to the perpendicular recording method, the frequency for the first-time writing is set at a high frequency (f2), and the frequency for overwriting is set at a low frequency (f9). The frequency f2 is ½ of the highest frequency f1 to be written on the magnetic disk 25 that is determined by the transfer rate. The frequency f9 is ⅛ of the highest frequency f1. Accordingly, the overwrite characteristics according to the perpendicular recording method are determined by measuring the connection strength between each adjacent bits through overwriting performed at a low frequency on bit strings written at a high frequency. If the component X is large, there is a large connection strength between adjacent bits.

Figure 17:
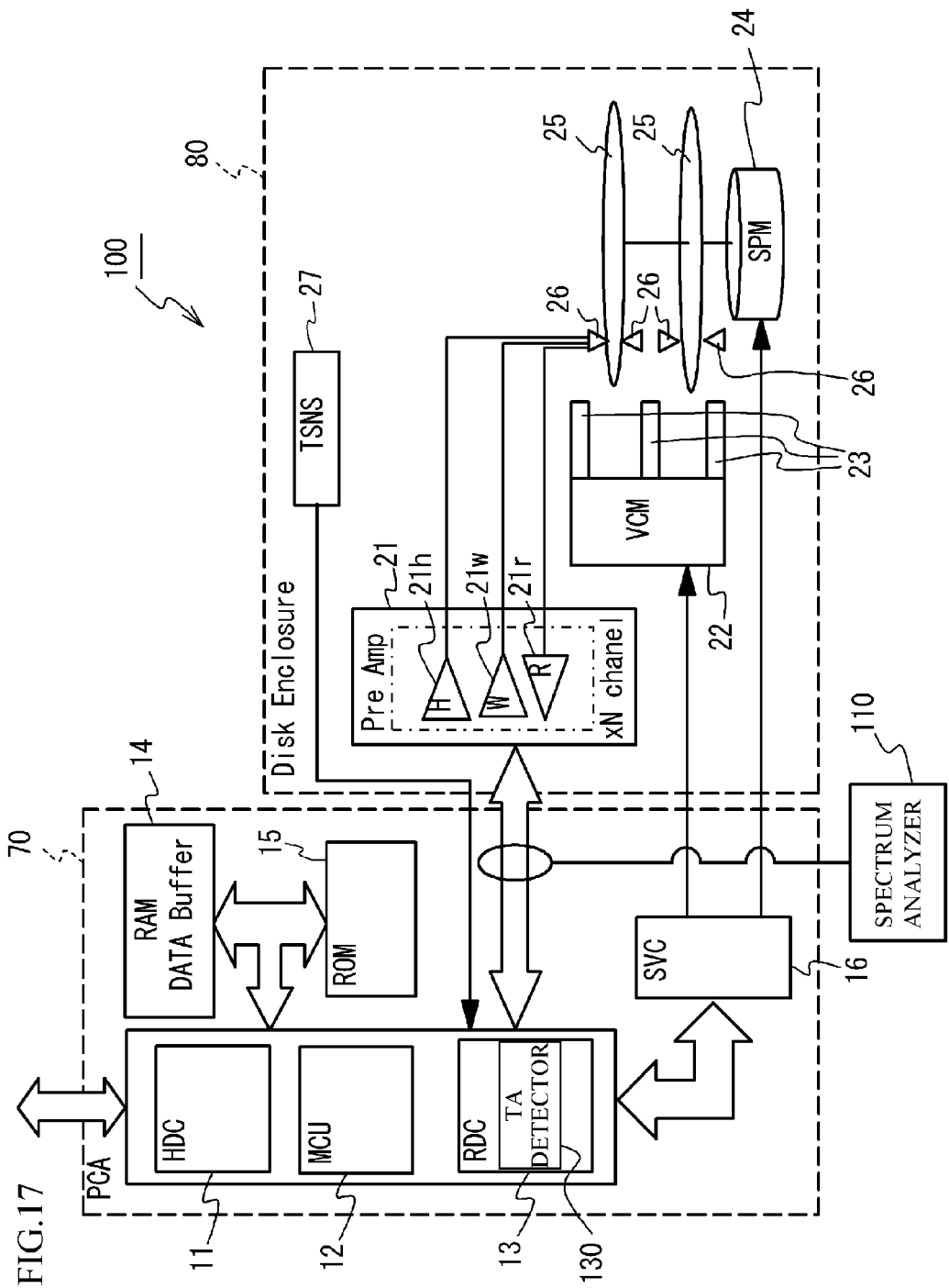
FIG. 17 depicts a device that is the same as the device depicted in FIG. 1, except that the device further includes a spectrum analyzer.

Conventionally, the overwrite characteristics are separately measured with a measuring instrument such as a spectrum analyzer 110 depicted in FIG. 17. In recent years, however, the overwrite characteristics can be measured with the HSC function (a harmonics sensor circuit) provided in the RDC 13 depicted in FIG. 1. The RDC 13 may be formed with Part Number 88C6710, manufactured by Marvell Technology Group Ltd.

The HSC function (the harmonics sensor circuit) is realized by applying DFT (Discrete Fourier Transform) to the frequency analysis in discrete digital signal processing, and the measurement results are output as frequency-phase converted signals as expressed by the following equations (4) and (5):

$$Y_{sin} = A \times \Sigma D(n) \sin(2\pi f) \quad (4)$$

$$Y_{cos} = B \times \Sigma D(n) \cos(2\pi f) \quad (5)$$

Therefore, by performing data processing on the power spectrum as $(Y_{sin}^2 + Y_{cos}^2)^{1/2}$, a measurement of the electromagnetic conversion characteristics equivalent to a measurement made by the spectrum analyzer 110 can be realized in the HDD 100.

Figure 18A:
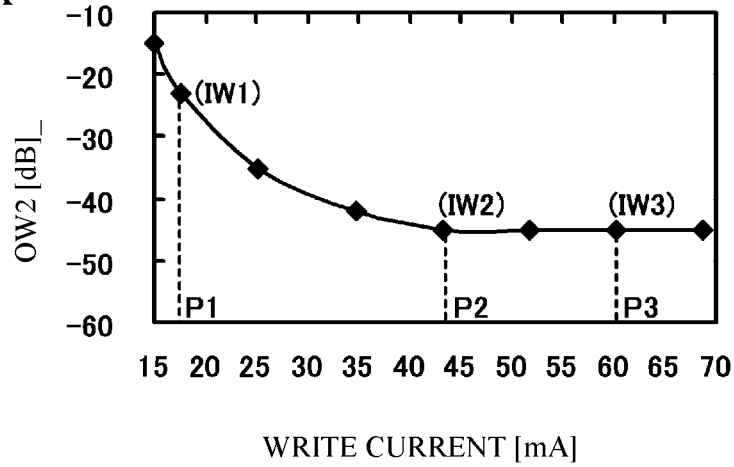
FIGS. 18A through 18C illustrate the overwrite saturation characteristics.
Figure 18B:
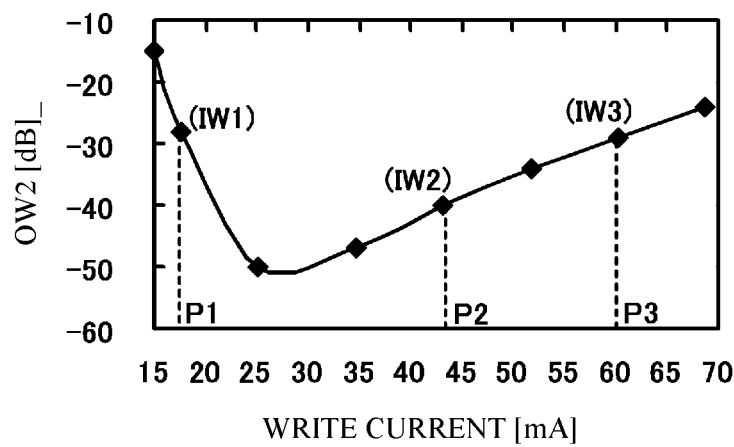
Figure 18C:
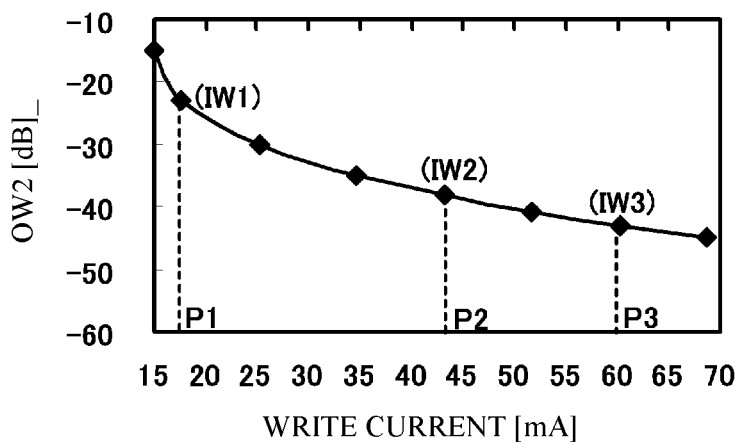

FIGS. 18A through 18C depict graphs obtained by measuring the saturation characteristics in the overwrite characteristics, where the write current is a parameter, and the head flying height is varied.

FIG. 18A depicts the result of a measurement of the saturation characteristics of the overwrite characteristics with a certain head flying height, where the write current is a parameter. FIG. 18A depicts such characteristics that are saturated when the measured write current is approximately 43 mA, and become constant thereafter (normal saturation characteristics).

FIG. 18B depicts the result of a measurement of the saturation characteristics with a different head flying height from that in the case of FIG. 18A. As depicted in FIG. 18B, the characteristics reach the optimum point when the write current is approximately 28 mA, but deteriorate thereafter as the write current becomes higher. This situation (called a supersaturation phenomenon) is often observed when the flying height is too small. Such a supersaturation phenomenon is also called a demagnetizing action, meaning that there is such a counteraction that the trailing edge of the overshoot or undershoot waveform of the write current affects the already magnetized recorded data, and erases the magnetization state. Such a situation is not preferable, since the optimum point might be shifted by the variation in the setting of the write current, or the error rate with respect to the set write current might deteriorate.

FIG. 18C depicts the result of a measurement of the saturation characteristics made with a different head flying height from those in FIGS. 18A and 18B. As can be seen from FIG. 18C, a saturation point does not appear even when the write current reaches approximately 68 mA. In such an unsaturated state, magnetization saturation cannot be achieved, since the flying height is too large and the saturation capability of the write current is not sufficient.

As described above, when the flying height of the head 26 is an optimum amount, the overwrite characteristics depicted in FIG. 18A (a normally saturated state) are achieved. When the flying height of the head 26 is too small, the overwrite characteristics depicted in FIG. 18B (a supersaturated state) are achieved. When the flying height of the head 26 is too large, the overwrite characteristics depicted in FIG. 18C (an unsaturated state) are achieved. Accordingly, the flying height to be achieved with the head (the target flying height) is calculated based on the above characteristics in this embodiment.

Figure 19:
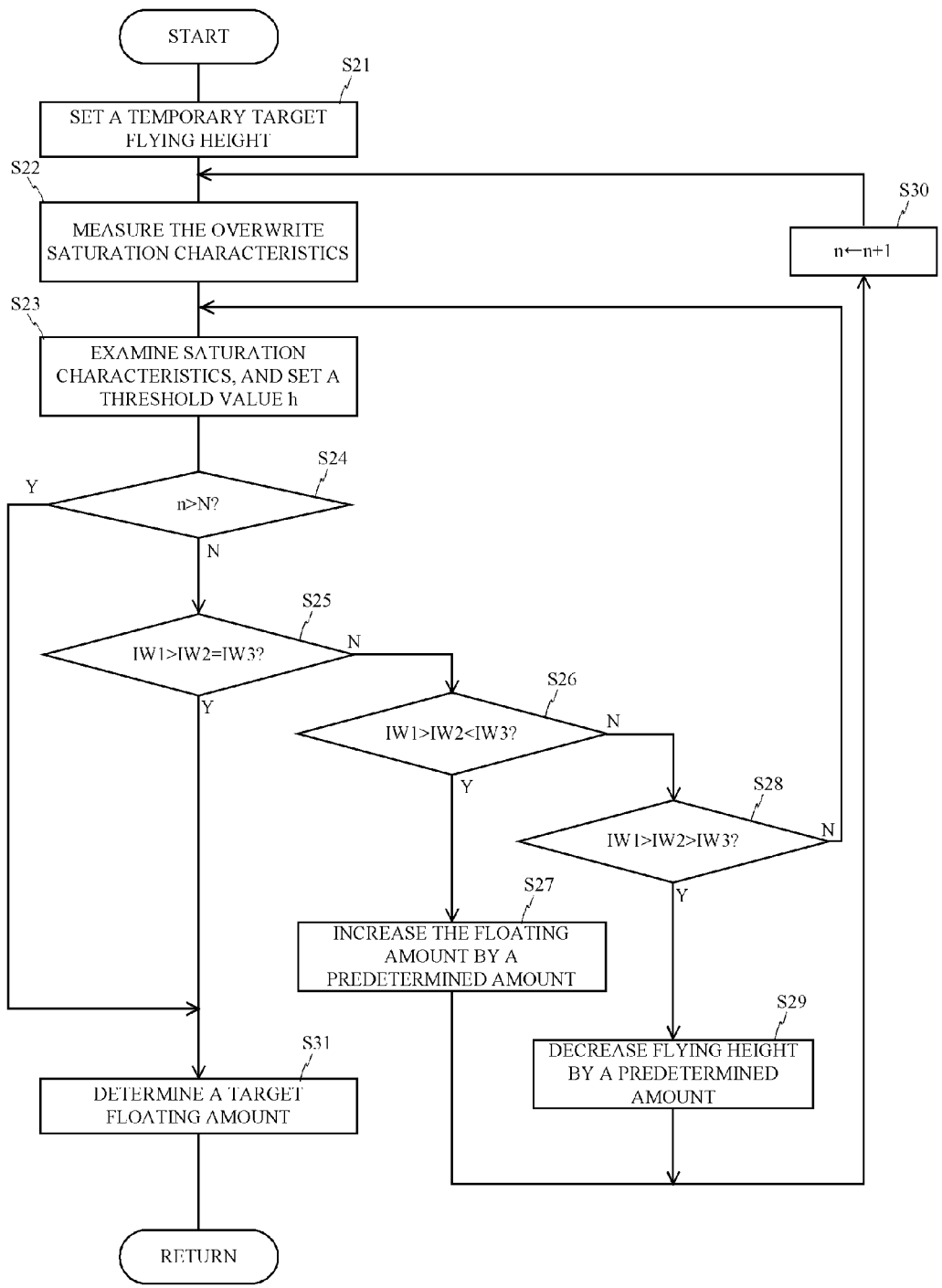
FIG. 19 is a flowchart depicting the subroutine for calculating a target flying height depicted in FIG. 13.

FIG. 19 is a flowchart depicting the procedure of step S10 of FIG. 13 (the procedure for calculating the target flying height based on the above overwrite characteristics). Referring to FIG. 19, the procedure for calculating the target flying height is described in the following. Like the other procedures depicted in FIG. 13, this calculating procedure is also carried out by the MCU 12 of FIG. 1 executing a program stored in the ROM 15 or the RAM 14, for example.

First, at step S21, a temporary target flying height is set. At step S22, the overwrite characteristics are measured, with the write current being a parameter, as depicted in FIGS. 18A through 18C. In this case, the overwrite characteristics are measured with the use of the HSC function (the harmonics sensor circuit) provided in the RDC 13, as described above.

At step S23, a threshold value h (that will be described later) is set, and a saturation characteristics determination is made. For the saturation characteristics determination, the parameter n representing the number of times the determination has been performed is set at the initial value of 1 in advance. At step S24, a check is made to determine whether the number n of times the determination has been performed is larger than a predetermined value N. If the result of this determination is negative, the operation moves on to step S25.

At step S25, the overwrite values (IW1, IW2, and IW3) at determination points P1, P2, and P3 that are set beforehand from the results of the measurements at step S22 (see FIGS. 18A through 18C). The overwrite values are compared with one another, and a check is made to determine whether the relationships among those overwrite values are expressed as IW1>IW2=IW3. The number of determination points is not limited to three, and may be larger than three. Although the overwrite values are compared with one another based on the differences among those values at step S25, the overwrite values are regarded as the same if the differences are smaller than the threshold value h that is set at step S23.

If the result of the determination at step S25 is positive, the completely saturated state depicted in FIG. 18A is observed. In such a situation, the head flying height is an optimum flying height, and should be a target flying height. At step S31, the flying height is determined to be the target flying height.

If the result of the determination at step S25 is negative, the operation moves on to step S26, and a check is made to determine whether the relationships among the overwrite values are expressed as IW1>IW2<IW3. If the result of this determination is positive, the supersaturated state depicted in FIG. 18B is observed, and the head flying height is too small. Therefore, the operation moves on to step S27, to increase the flying height by a predetermined amount. At step S30, the value n is incremented by 1, and the operation then returns to step S22. To increase the flying height by the predetermined amount, the heater power is calculated according to the equation (2), and the obtained heater power is supplied to the heater 26$h$. For example, in a case where the heater power to obtain a flying height of 10 nm is set at 33 mW, as described above, the heater power should be set at 17 mW so as to increase the flying height by 1 nm.

If the result of the determination at step S26 is negative, the operation moves on to step S28, and a check is made to determine whether the relationships among the overwrite values are expressed as IW1>IW2>IW3. If the result of this determination is positive, the unsaturated state depicted in FIG. 18C is observed, and the head flying height is too large. Therefore, the operation moves on to step S29, to decrease the flying height by a predetermined amount. At step S30, the value n is incremented by 1, and the operation then returns to step S22. To decrease the flying height by the predetermined amount, the heater power is calculated according to the equation (2). For example, in a case where the heater power to obtain a flying height of 10 nm is set at 33 mW, as described above, the heater power should be set at 40 mW so as to decrease the flying height by 1 nm.

Basically, it is considered that the result of the determination at step S28 does not become negative. However, if the result of the determination at step S28 actually becomes negative, there is a possibility that the range of the threshold value h is too narrow. Therefore, the operation returns to step S23, to reset the threshold value h (to set a new threshold value h'). After that, the procedures of steps S25, S26, and S28 are carried out with the use of the new threshold value h'.

The above procedures are repeated until the result of the determination at step S25 becomes positive. Alternatively, the measurement of the overwrite characteristics is repeated, with the flying height being changed at step S27 or S29. When the result of the determination at step S25 becomes positive, or when the number of repetitions exceeds N (when the result of the determination at step S24 becomes positive) though the result of the determination at step S25 is not positive, the flying height at that time is determined to be the target flying height.

After the target flying height is determined in the above manner, the operation returns to step S11 of FIG. 13.

At step S11, the target flying height determined at step S10 is input to the heater power map, so as to create a new heater power map. Referring now to FIGS. 20A and 20B, the heater power map is described.

FIG. 20A depicts a heater power map formed with the heater power set values to be observed when read requests are made. FIG. 20B depicts a heater power map formed with the heater power set values to be observed when write requests are made.

At the time of a write request, the head 26 generates heat, as the write current is applied to the write head 26$w$. Therefore, with the heat generation being taken into consideration, the values depicted in FIG. 20B ($\alpha 00'$ to $\alpha nm'$) are obtained by correcting the heater power values ($\alpha 00$ to $\alpha nm$) at the time of read requests with the amount of heat generation caused by the write current (or by subtracting the amount of heat generation caused by the write current from the heater power values at the time of read requests).

In this embodiment, the procedures of steps S2 through S11 are repeatedly carried out, to store the heater power values $\alpha 00$ to $\alpha nm$ determined with respect to the respective head numbers (head NO.) 0 through n and the respective zone numbers 0 through m. Also, a heater power map is created for each internal temperature of the HDD 100 measured at step S1 of FIG. 13. Accordingly, more than one heater power map depicted in FIG. 20A and more than one heater power map depicted in FIG. 20B are created with respect to various internal temperatures, though not depicted in the drawings.

Those heater power maps may be recorded on predetermined regions on the magnetic disk 25, or may be recorded on a nonvolatile memory such as the ROM 15 in the HDD 100.

Figure 21:
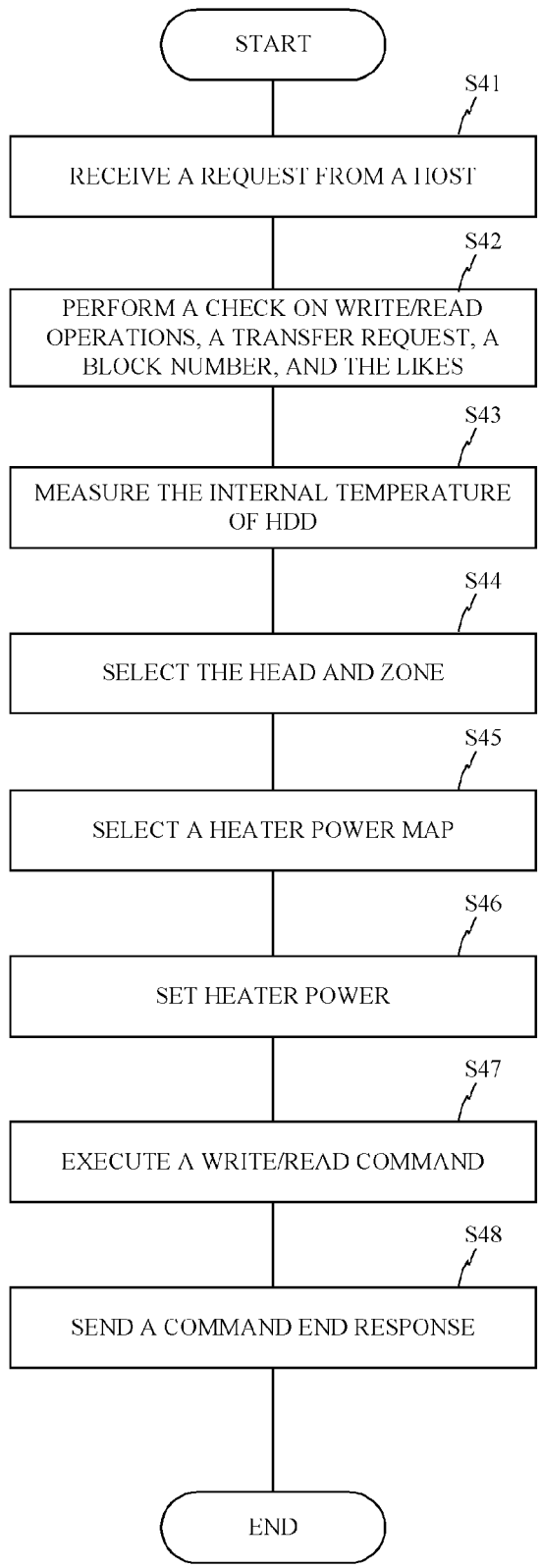
FIG. 21 is a flowchart depicting an operation to be performed by the HDD using heater power maps.

Referring now to the flowchart depicted in FIG. 21, an operation to be performed by the HDD 100 using the heater power maps created in the above manner is described. The operation illustrated in FIG. 21 is an operation to be performed after the shipment of the HDD 100, and is to be performed by the MCU 12 of the head flying height control device of FIG. 1 executing a program stored in the ROM 15 or the RAM 14, for example.

At step S41 in FIG. 21, a request (or a command) from a host device is received via a host interface. At step S42, a check is made to determine whether the received request is a write request or a read request, and to examine the contents of a request for the number of transfer request blocks or the like. At step S43, the internal temperature of the HDD 100 is measured with the temperature sensor 27. At step S44, Based on the contents of the request examined at step S42, the head 26 to be used for access and the zone to be accessed on the magnetic disk 25 are selected.

At step S45, the heater power map corresponding to the internal temperature measured at step S43 is selected and read from the magnetic disk 25 or a memory such as the ROM 15 in the HDD 100. At step S46, the heater power value corresponding to the head 26 and the zone selected at step S44 is read out, and, based on the read heater power value, the amount of heat to be generated from the heater 26$h$ of the selected head 26 is controlled to be an optimum amount via the heater control circuit 21$a$. At step S47, a write command or a read command is executed. In a case where a read command is executed after a predetermined period of time has passed since the power supply to the heater 26$h$, a read operation is performed. In a case where a write command is executed after a predetermined period of time has passed since the power supply to the heater 26$h$, a write operation is performed. At step S46, a command execution end response is sent to the host device via the host interface, and the operation comes to an end.

In this manner, a read operation in response to a read request or a write operation in response to a write request is performed where the head flying height of the head 26 corresponding to each magnetic disk 25 to be accessed is optimized with respect to the environmental temperature of the HDD 100 and each zone on the magnetic disk 25.

Figure 22A:
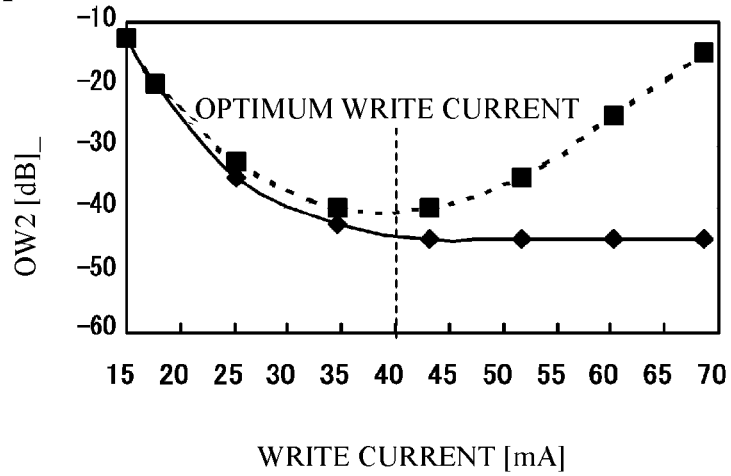
FIGS. 22A through 22C illustrate a method for determining optimum write currents.
Figure 22B:
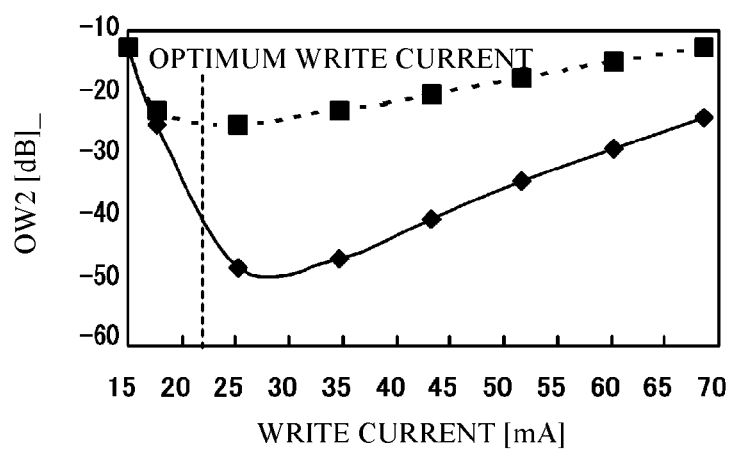
Figure 22C:
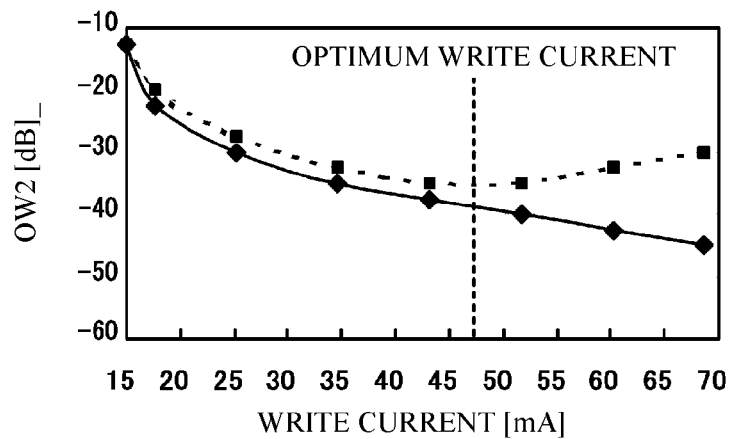

Referring now to FIGS. 22A through 22C, a method for determining an optimum write current value to be used in the above write operation is described.

When an optimum write current value is determined, it is necessary to consider the influence of data writing performed on a track adjacent to the subject track (adjacent track interference (ATI)). In FIGS. 22A through 22C, each solid-line graph indicates the saturation characteristics observed where data is not written on any tracks adjacent to the write target track, and each dotted-line graph depicts the saturation characteristics observed where data is written on adjacent tracks m times.

When an optimum write current value is determined in this embodiment, it is necessary to use the dotted-line graphs that reflect the influence of adjacent track interference (ATI). In this embodiment, the head flying height is set so that the overwrite characteristics exhibit the characteristics depicted in FIG. 22A, as described above. Accordingly, the current value (40 mA in FIG. 22A) with which the overwrite value becomes most preferable on the dotted-line graph in FIG. 22A is determined to be the optimum write current value.

As can be seen from FIG. 22A, while the write current value corresponding to the saturation point of the overwrite value in a case where data is not written on adjacent tracks is 43 mA, the optimum write current value determined by taking into account a case where data is written on adjacent tracks m times (taking "side erasing" into account) is 40 mA. Accordingly, the two current values are very close to each other. Thus, by using this method for determining an optimum write current value, read error rate loss can be minimized.

In the supersaturated state depicted in FIG. 22B, while the write current value corresponding to the saturation point of the overwrite value in a case where data is not written on adjacent tracks is 28 mA, the optimum write current value determined by taking into account a case where data is written on adjacent tracks m times (taking "side erase" into account) is 22 mA. As can be seen from the solid-line graph, when data is actually written with the use of the write current of 22 mA, the gradient at the portion of 22 mA in write current is steep (or the sensitivity is high), and error rate loss is large. In the unsaturated state depicted in FIG. 22C, the optimum write current value is 47 mA, which corresponds to an unsaturated region. As a result, there is a high probability that error rate loss is caused.

In this embodiment, an optimum write current can be set in a completely saturated state by controlling the head flying height in the above described manner. Accordingly, error rate loss can be prevented, and the reliability of the HDD can be increased.

As described so far, in accordance with this embodiment, the overwrite saturation characteristics are measured with the write current used as a parameter, every time the head flying height is varied, with the reference state being the situation where the head flying height is zero. Accordingly, the head flying heights can be associated with the overwrite saturation characteristics. Based on the results of the associating process, the head flying height with which suitable overwrite saturation characteristics are achieved is determined to be the target flying height. Based on the target flying height, the head flying height is adjusted. Thus, the head flying height can be set at such a value as to obtain a desirable overwrite value. Also, in this embodiment, the overwrite saturation characteristics with respect to the write current are taken into account when the flying height is determined. In this manner, error rate loss and side erase in a supersaturated state or an unsaturated state can be improved. Thus, the data write and read capability can be increased, and a HDD with higher reliability can be provided.

Also, in accordance with this embodiment, where the head flying height is set (adjusted) in the above described manner, an optimum write current is determined based on the overwrite saturation characteristics. Accordingly, data can be written on the magnetic disk 25 with such a write current as to prevent error rate loss. A suitable head flying height can also be obtained, even if an optimum write current is determined by taking into account a case where data is written on adjacent tracks m times (by taking side erase into account). Thus, read error rate loss can be minimized.

Also, in accordance with this embodiment, the measurement is carried out several times at different radial positions on the magnetic disk 25 on which the head is to be positioned. Accordingly, a target flying height and an optimum write current can be determined at each of the radial positions. Thus, it is possible to determine appropriate target flying heights and optimum write currents in accordance with the radial positions at which the head performs data writing or reading.

Furthermore, in accordance with this embodiment, the measurement is carried out several times at different environmental temperatures of the head. Accordingly, a target flying height and an optimum write current can be properly determined at each of the temperatures. Thus, it is possible to determine appropriate target flying heights and optimum write currents in accordance with the variation in environmental temperature of the head.

Also, in accordance with this embodiment, the overwrite characteristics are measured with the use of the HSC function of the RDC 13. Accordingly, a measurement equivalent to a measurement carried out with a spectrum analyzer can be realized in the HDD 100 without a spectrum analyzer or the like. However, the present invention is not limited to that arrangement. In a case where the HSC function (the harmonics sensor circuit) is not installed in the RDC 13, the spectrum analyzer depicted in FIG. 17 may be connected to the HDD, and the overwrite characteristics may be measured with the use of the spectrum analyzer.

Figure 23A:
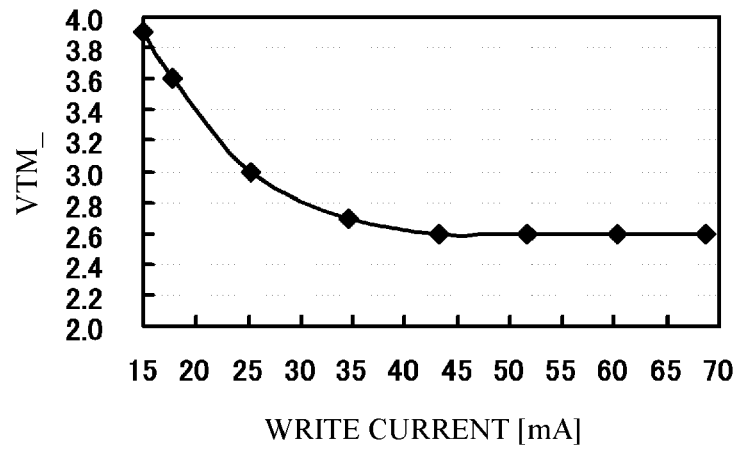
FIGS. 23A through 23C illustrate the VTM saturation characteristics.
Figure 23B:
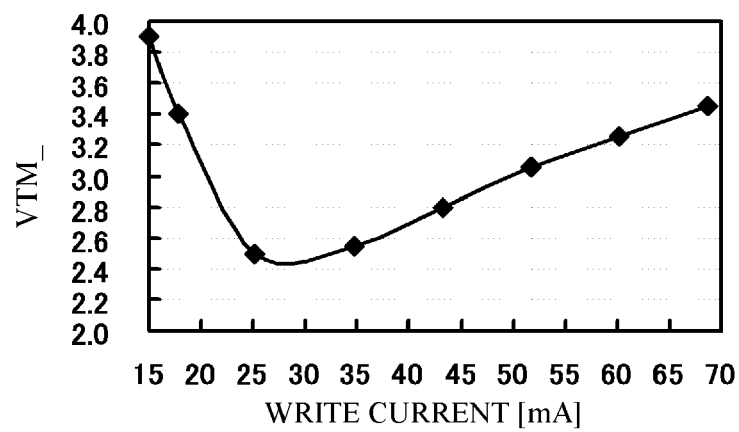
Figure 23C:
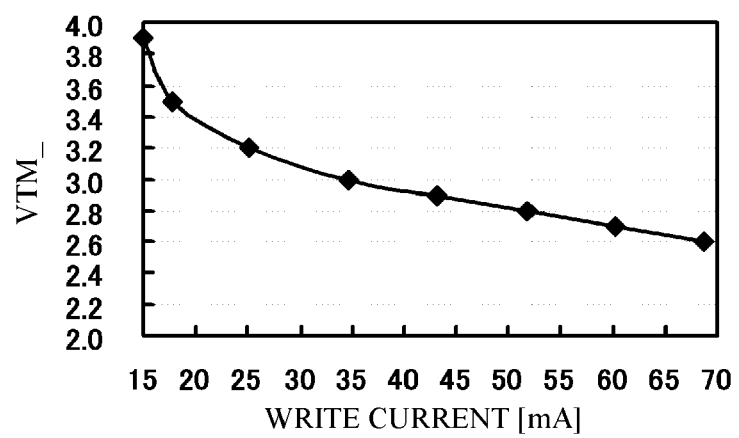

In the above embodiment, target flying heights and optimum write current values are determined based on the overwrite saturation characteristics, but the present invention is not limited to that operation. For example, as depicted in FIGS. 23A through 23C, VTM exhibits the same saturation characteristics as the overwrite saturation characteristics (see FIGS. 18A through 18C). Accordingly, in the above embodiment, it is possible to determine target flying heights and optimum write current values based on the VTM saturation characteristics, instead of the overwrite saturation characteristics. Furthermore, instead of the overwrite saturation characteristics and VTM saturation characteristics, the saturation characteristics of the other electromagnetic conversion characteristics of the head 26 having write currents as a parameter may be used, so as to determine target flying heights and optimum write current values.

Although not depicted in the drawings, the output level of the head 26 exhibits the same saturation characteristics as those depicted in FIGS. 18A through 18C and FIGS. 23A through 23C (actually, the saturation characteristics that are represented by upside-down graphs of those depicted in FIGS. 18A through 18C and FIGS. 23A through 23C). Accordingly, in the above embodiment, instead of the electromagnetic conversion characteristics such as overwrite characteristics and VTM, the saturation characteristics of the output level of the head 26 having write currents as a parameter may be used to determine target flying heights and optimum write current values. Also, in the above embodiment, two or more kinds of saturation characteristics among the overwrite saturation characteristics, the VTM saturation characteristics, the saturation characteristics of the other electromagnetic conversion characteristics, and the saturation characteristics of the output level of the head may be used (or combined) to determine head flying heights and write current values.

In the above embodiment, a target flying height is measured and a heater power map is created for each temperature and each zone on the magnetic disk 25. However, the present invention is not limited to that operation, and heater power maps may be created, regardless of a temperature variation or zone differences.

In the above embodiment, all the zones on the magnetic disk 25 are subjected to the measurement (the map creating processing). However, the present invention is not limited to that operation, and only particular zones may be subjected to the measurement. In such a case, the results of the measurement of the particular zones may be shared with other zones. Alternatively, the values in the other zones may be obtained by correcting the results of the measurement in the particular zones with the use of the floating profile of the head flying heights with respect to the radial positions R depicted in FIG. 6, or may be calculated based on the results of the measurement in the particular zones.

Furthermore, it is of course possible to use heater current maps showing heater currents as the heat control parameters that are determined for the respective head numbers and the respective zone numbers, and are to be applied to the heater 26g, instead of the heater power maps showing heater power values as the heat control parameters for controlling the heating by the heater.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A method for controlling a flying height of a head, the method comprising:
    detecting contact of a head having a heater with a corresponding storage medium, and associating the amount of heat generated by the heater when the contact is detected with a situation where the flying height is zero;
    measuring at least one of first saturation characteristics of Viterbi trellis margin (VTM) or an error rate of data written on the storage medium by the head, and second saturation characteristics of electromagnetic conversion characteristics of the head, the measuring being carried out every time the flying height of the head is varied, with a reference being the situation where the flying height is zero, a current used for writing the data being a parameter in at least one of the first saturation characteristics and the second saturation characteristics; and
    adjusting the flying height, based on a measurement result of the measuring.

2. The method as claimed in claim 1, wherein:
    the associating and the measuring are carried out a plurality of times at different radial positions on the storage medium; and
    the adjusting includes adjusting the flying height, based on a measurement result of the measuring at a radial position at which the head having the flying height being adjusted is located.

3. The method as claimed in claim 1, wherein:
    the associating and the measuring are carried out a plurality of times at different temperatures; and
    the adjusting includes adjusting the flying height, based on a measurement result of the measuring carried out at an environmental temperature of the head measured prior to the adjusting.

4. The method as claimed in claim 1, wherein the electromagnetic conversion characteristics are measured with the use of a harmonics sensor circuit provided in a read channel that performs code modulation on data read from the storage medium.

5. A method for determining a write current value, the method comprising:
    adjusting a flying height of a head by a head flying height control process including:
        detecting contact of a head having a heater with a corresponding storage medium, and associating the amount of heat generated by the heater when the contact is detected with a situation where the flying height is zero;
        measuring at least one of first saturation characteristics of a Viterbi trellis margin (VTM) or an error rate of data written on the storage medium by the head, and second saturation characteristics of electromagnetic conversion characteristics of the head, the measuring being carried out every time the flying height is varied, with a reference being the situation where the flying height is zero, a current used for writing the data being a parameter in at least one of the first saturation characteristics and the second saturation characteristics; and
    adjusting the flying height, based on a measurement result of the measuring; and
    determining a write current value for writing data on the storage medium with the flying height being adjusted, based on at least one of the first saturation characteristics and the second saturation characteristics, a current used for writing the data being a parameter in at least one of the first saturation characteristics and the second saturation characteristics.

6. The method as claimed in claim 5, wherein determining the current value includes determining the write current value, based on the saturation characteristics measured in a situation where data is written on a track adjacent to a track subjected to data writing on the storage medium.

7. A storage device comprising:
    a detector configured to detect contact of a head having a heater with a corresponding storage medium;
    an associating module configured to associate the amount of heat generated by the heater when the contact is detected by the detector, with a situation where a flying height of the head is zero;
    a measuring module configured to measure at least one of first saturation characteristics of a Viterbi trellis margin (VTM) or an error rate of data written on the storage medium by the head, and second saturation characteristics of electromagnetic conversion characteristics of the head, every time the flying height is varied, with a reference being the situation where the flying height is zero, a current used for writing the data being a parameter in at least one of the first saturation characteristics and the second saturation characteristics; and
    an adjusting module configured to adjust the flying height, based on a measurement result obtained by the measuring module.

8. The storage device as claimed in claim 7, further comprising
a current value determining module configured to determine a write current value for writing data on the storage medium, with the flying height being adjusted.

9. The storage device as claimed in claim 8, wherein the current value determining module is configured to determine the write current value, based on the saturation characteristics measured in a situation where data is written on a track adjacent to a track subjected to data writing on the storage medium.

* * * * *